(12) United States Patent
Ennis et al.

(10) Patent No.: US 8,601,632 B2
(45) Date of Patent: Dec. 10, 2013

(54) VEHICLE WASHING APPARATUS WITH A MOVABLE BRUSH ARM CARRIAGE

(75) Inventors: G. Thomas Ennis, Inglewood, CA (US); Alex Chavez, Hesperia, CA (US)

(73) Assignee: N/S Corporation, Inglewood, CA (US)

(*) Notice: Subject to any disclaimer, the term of this patent is extended or adjusted under 35 U.S.C. 154(b) by 147 days.

(21) Appl. No.: 13/278,843

(22) Filed: Oct. 21, 2011

(65) Prior Publication Data
US 2012/0124761 A1  May 24, 2012

Related U.S. Application Data

(60) Provisional application No. 61/415,027, filed on Nov. 18, 2010.

(51) Int. Cl.
*B60S 3/06* (2006.01)
(52) U.S. Cl.
USPC .................... 15/53.3; 15/53.2; 15/DIG. 2
(58) Field of Classification Search
USPC .................... 15/53.1–53.3, 97.3, DIG. 2
See application file for complete search history.

(56) References Cited

U.S. PATENT DOCUMENTS

| | | | |
|---|---|---|---|
| 3,471,883 A | | 10/1969 | Ennis |
| 3,559,225 A | * | 2/1971 | Gougoulas ............... 15/53.2 |
| 3,594,843 A | | 7/1971 | Sesia |
| 3,601,833 A | * | 8/1971 | Takeuchi ............... 15/53.2 |
| 3,618,152 A | * | 11/1971 | Capra ............... 15/53.2 |
| 3,633,231 A | * | 1/1972 | Capra ............... 34/666 |
| 3,662,419 A | | 5/1972 | Dini |
| 3,720,979 A | | 3/1973 | Ennis |
| 3,747,151 A | | 7/1973 | Takeuchi |
| 3,852,842 A | | 12/1974 | Weigele et al. |
| 3,892,002 A | | 7/1975 | Horner et al. |
| 3,913,161 A | | 10/1975 | Takeuchi |
| 3,921,243 A | | 11/1975 | Takeuchi |
| 3,926,663 A | | 12/1975 | Gray |
| 4,021,877 A | * | 5/1977 | Miner ............... 15/53.2 |
| 4,024,598 A | * | 5/1977 | Miner ............... 15/53.2 |

(Continued)

FOREIGN PATENT DOCUMENTS

| | | | |
|---|---|---|---|
| DE | 19524748 | * | 1/1997 |
| EP | 811537 | * | 12/1997 |

(Continued)

OTHER PUBLICATIONS

U.S. Appl. No. 08/987,378, Non-Final Rejection, Dec. 7, 1998.

(Continued)

*Primary Examiner* — Mark Spisich
(74) *Attorney, Agent, or Firm* — Risso & Associates

(57) ABSTRACT

Described is a vehicle washing apparatus with a movable brush arm carriage. The vehicle washing apparatus includes a carriage frame that can be suspended above a passing vehicle. A brush arm carriage is slidably connected with the carriage frame. A carriage drive system is connected with the carriage frame and the brush arm carriage for causing the brush arm carriage to slide along the length of the carriage frame. A brush arm is rotatably connected with the brush arm carriage. A cleaning brush is rotatably connected with the brush arm. Finally, a brush drive system is included for causing the cleaning brush to rotate. Thus, after having passed under the carriage frame, the cleaning brush can be pressed against the rear of a vehicle and rotated to clean the rear of the vehicle.

12 Claims, 33 Drawing Sheets

(56) References Cited

U.S. PATENT DOCUMENTS

| | | | |
|---|---|---|---|
| 4,035,862 A | 7/1977 | Ennis et al. | |
| 4,194,923 A | 3/1980 | Johnson | |
| 4,225,995 A | 10/1980 | Ennis | |
| 4,299,003 A | 11/1981 | Ennis | |
| 4,424,602 A | 1/1984 | Belanger et al. | |
| 4,445,246 A | 5/1984 | Hanna | |
| 4,769,868 A | 9/1988 | Pagnanelli et al. | |
| 4,935,982 A | 6/1990 | Ennis | |
| 4,946,513 A * | 8/1990 | Del Prato et al. | 134/18 |
| 5,077,859 A | 1/1992 | Ennis | |
| 5,279,013 A * | 1/1994 | Krichbaum | 15/53.3 |
| 5,715,558 A | 2/1998 | Johnson | |
| 5,930,859 A * | 8/1999 | Ennis | 15/53.3 |
| 6,264,754 B1 | 7/2001 | Bowman | |
| 7,293,316 B2 * | 11/2007 | Ennis | 15/53.3 |

FOREIGN PATENT DOCUMENTS

| | | | |
|---|---|---|---|
| GB | 2176757 | * | 1/1987 |
| JP | 61-75046 | * | 4/1986 |
| JP | 3-79455 | * | 4/1991 |
| JP | 5-105039 | * | 4/1993 |
| JP | 6-344872 | * | 12/1994 |

OTHER PUBLICATIONS

U.S. Appl. No. 08/987,378, Notice of Allowance, Feb. 25, 1999.
U.S. Appl. No. 10/861,516, Notice of Allowance, Jul. 5, 2007.

* cited by examiner

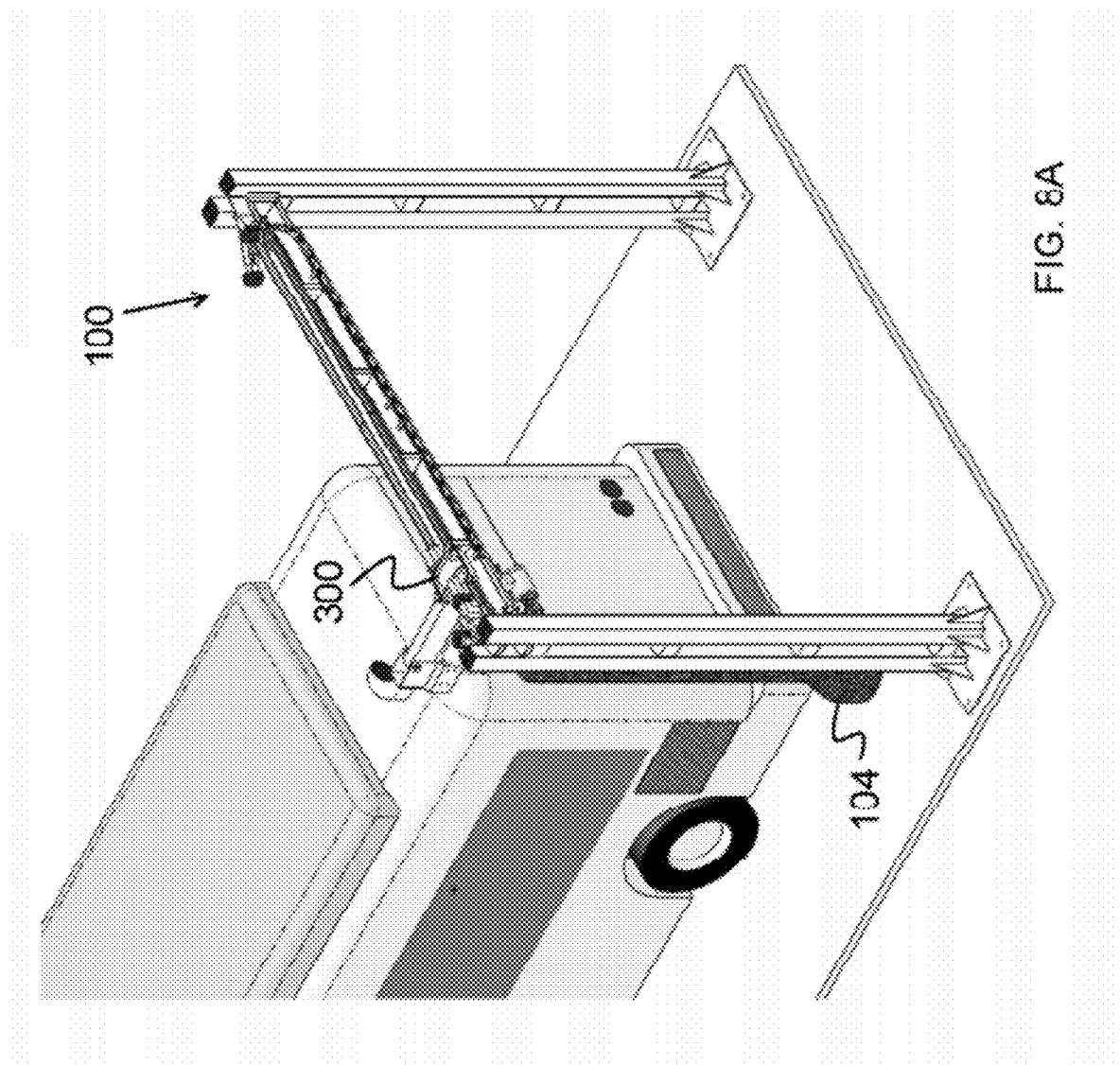

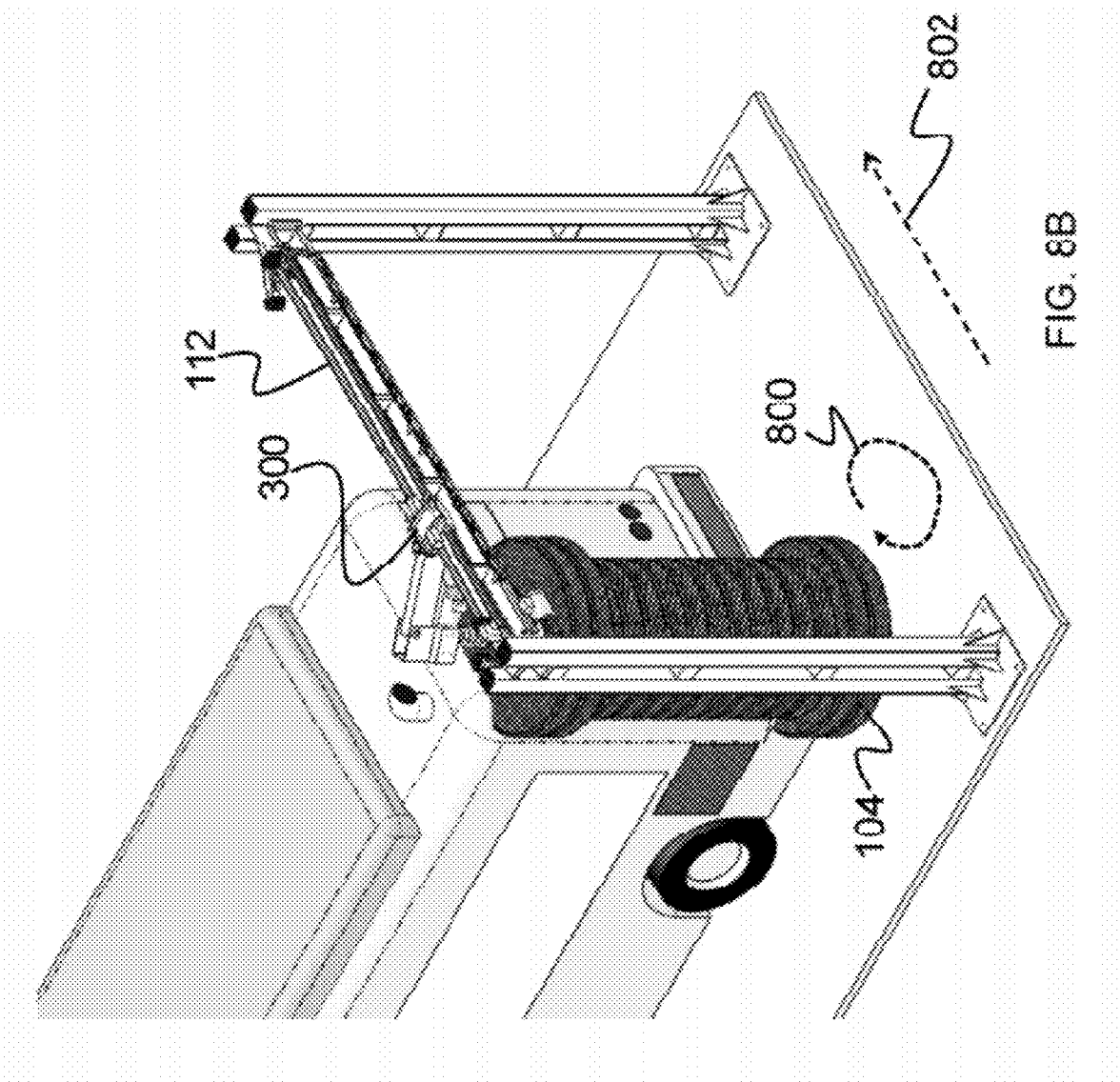

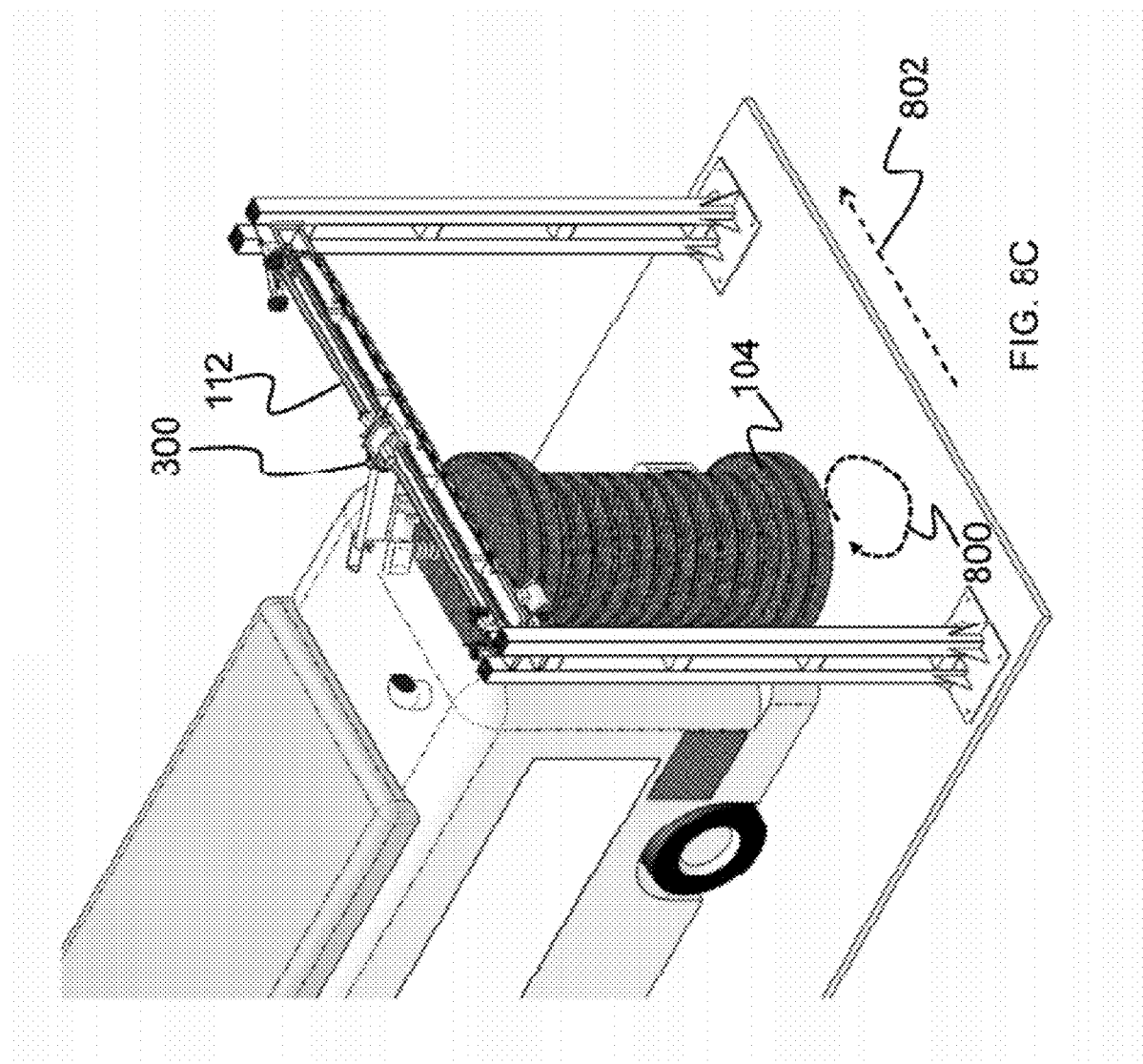

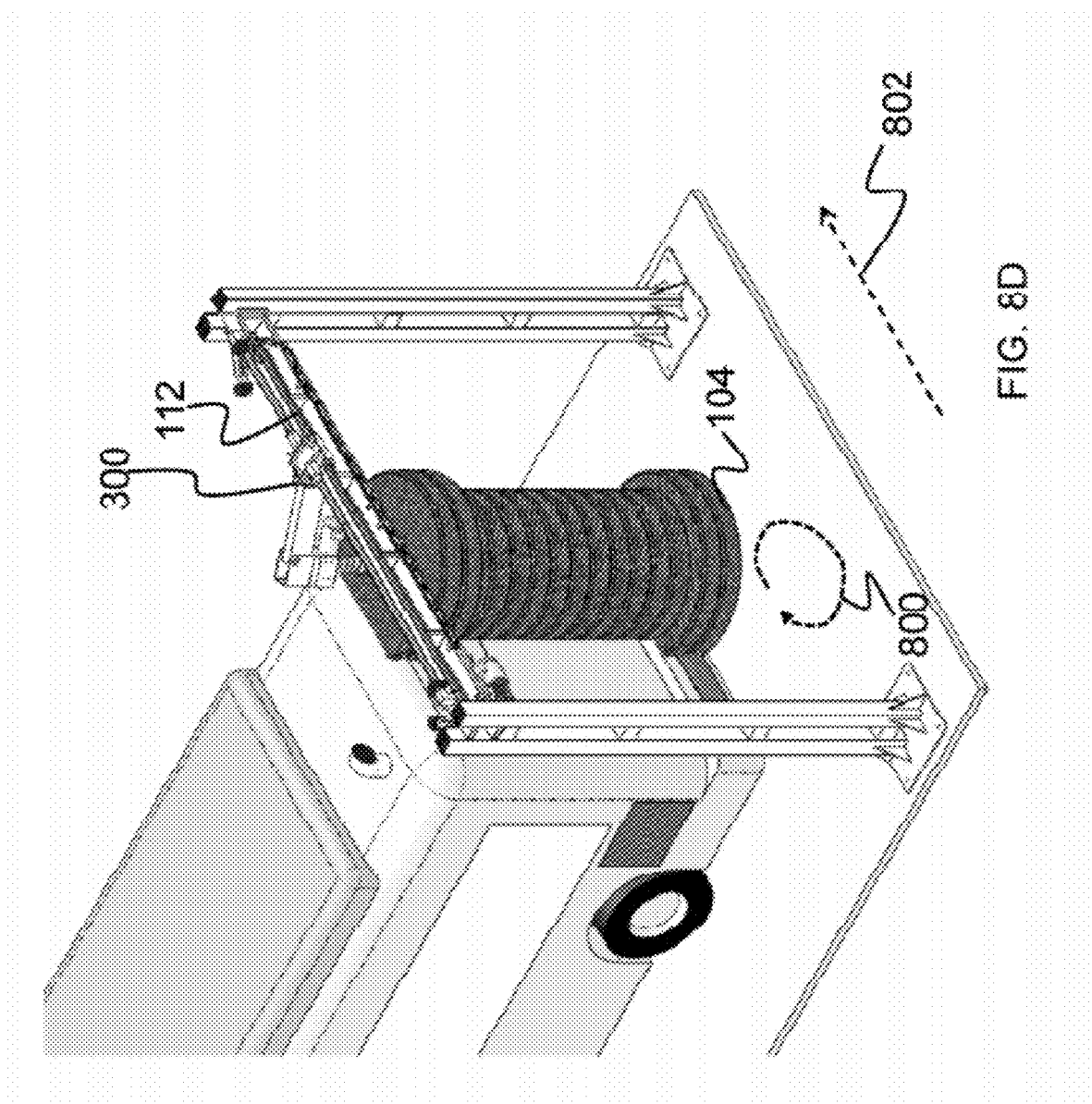

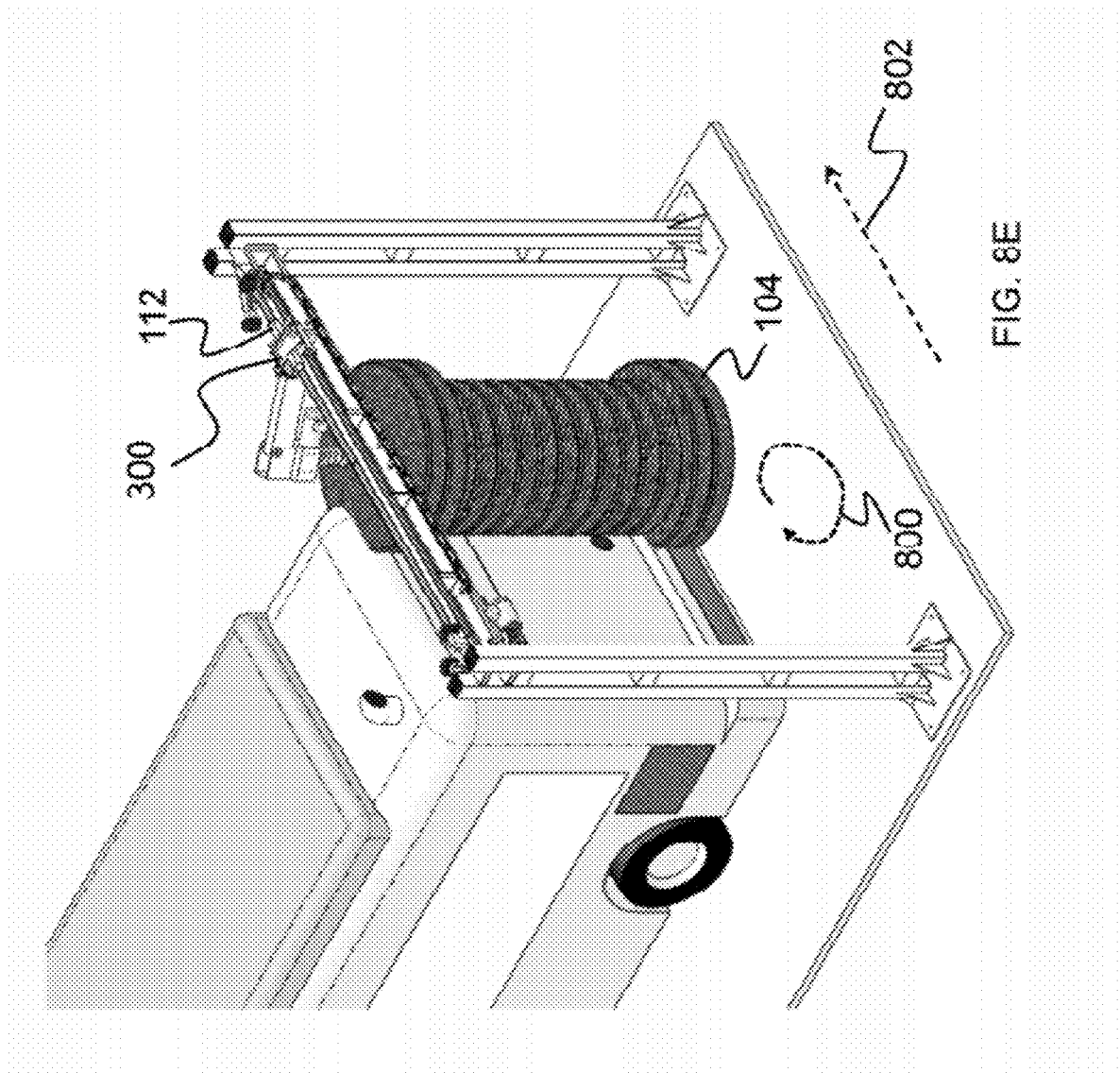

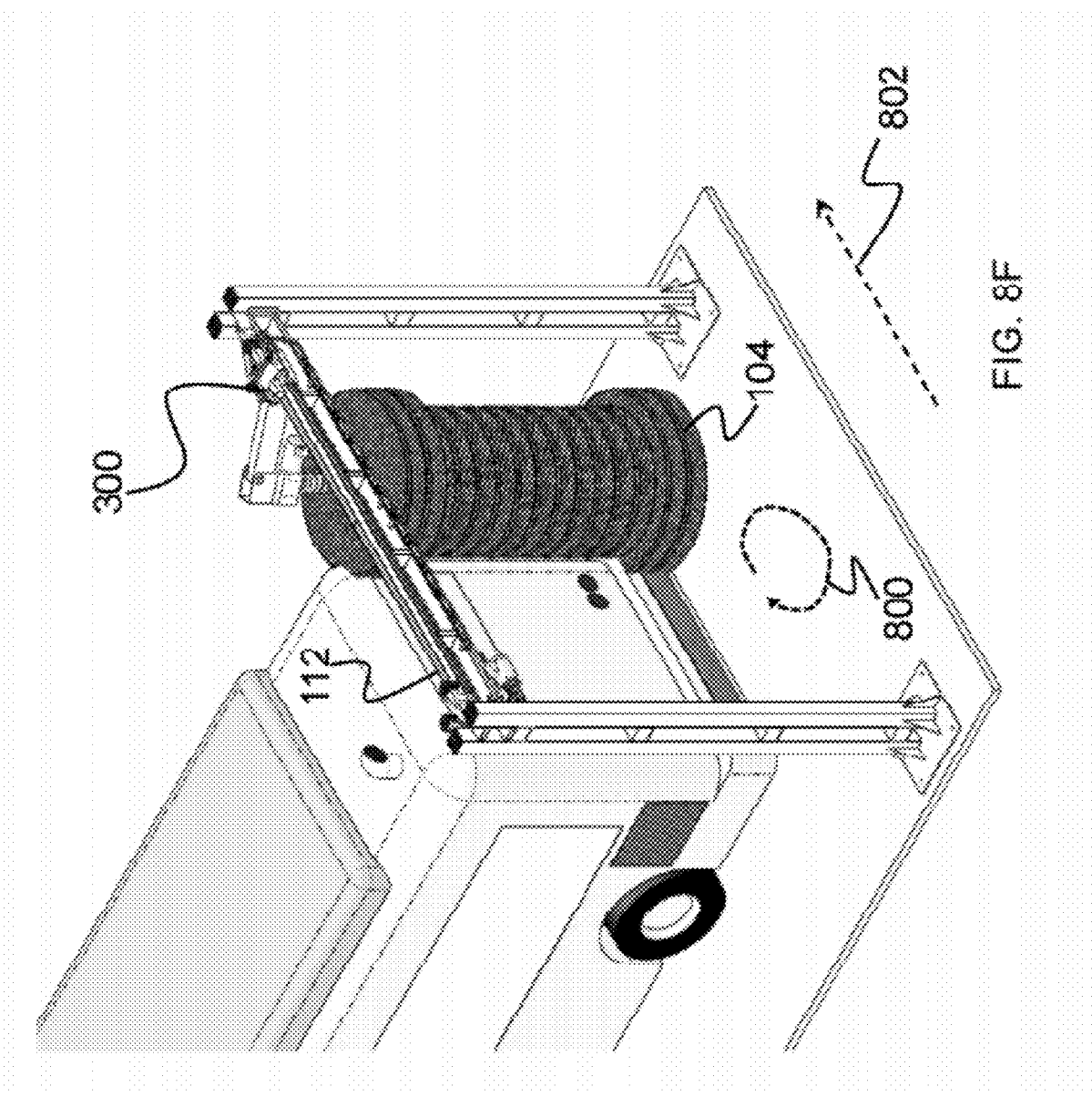

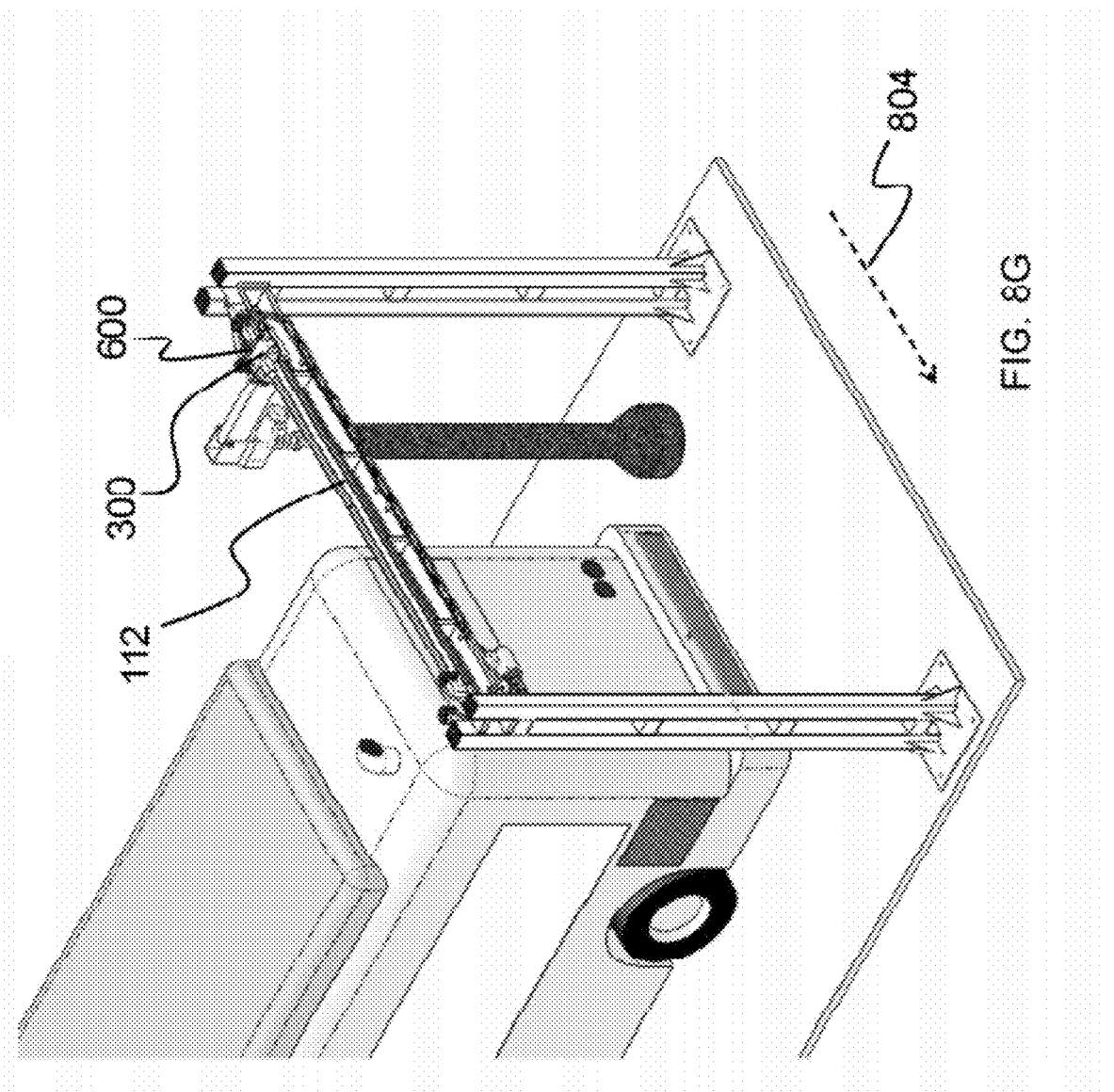

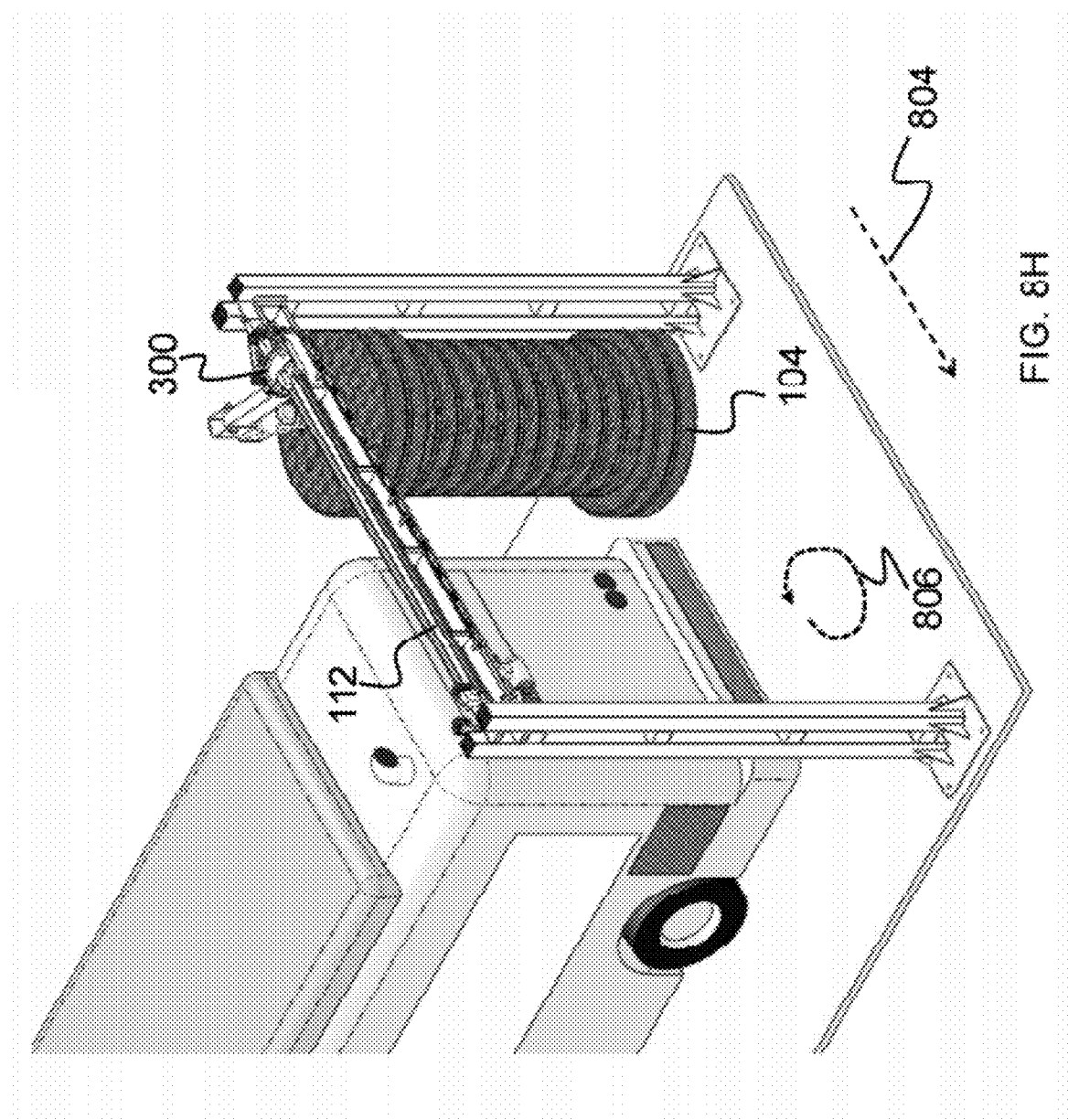

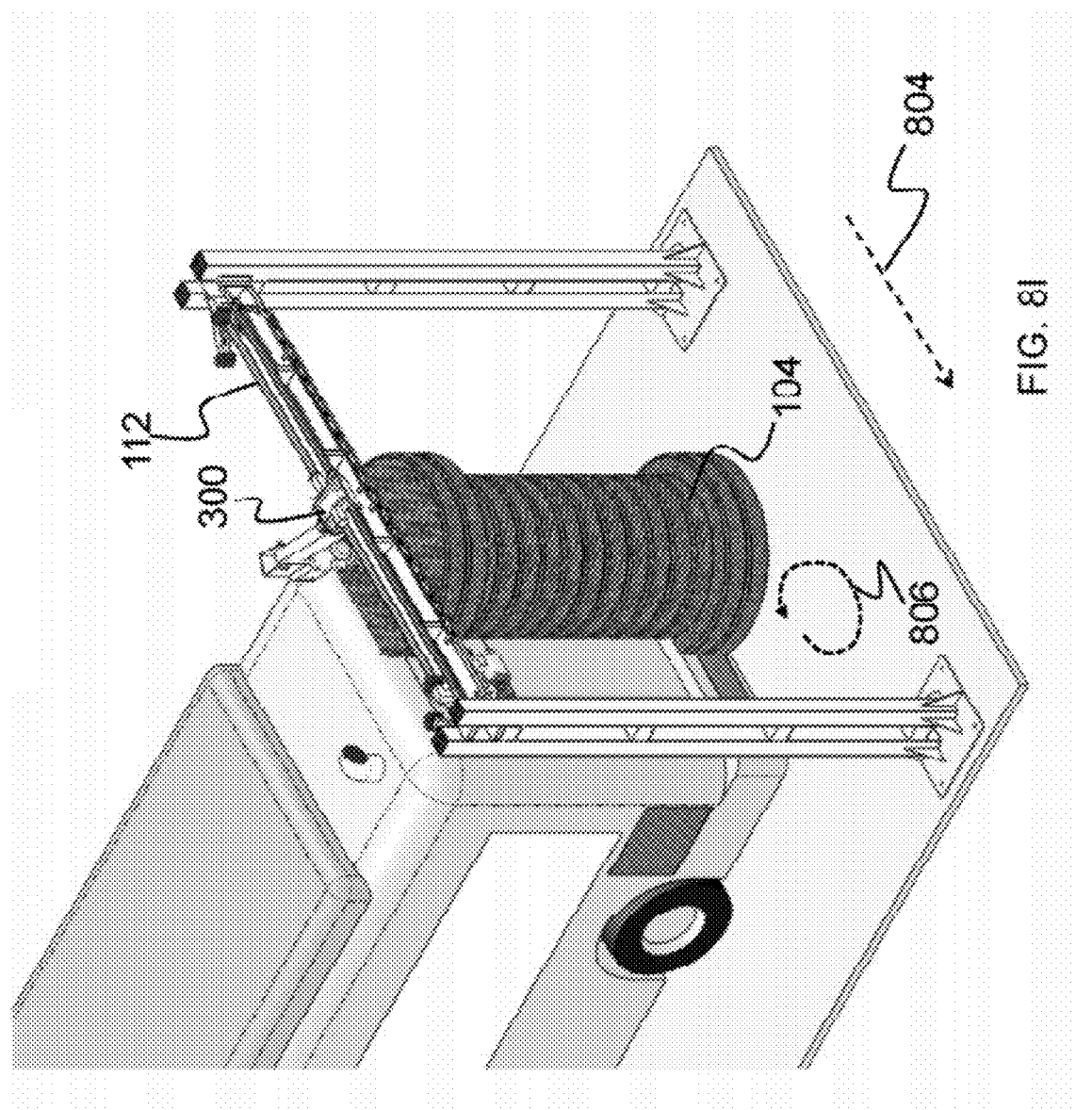

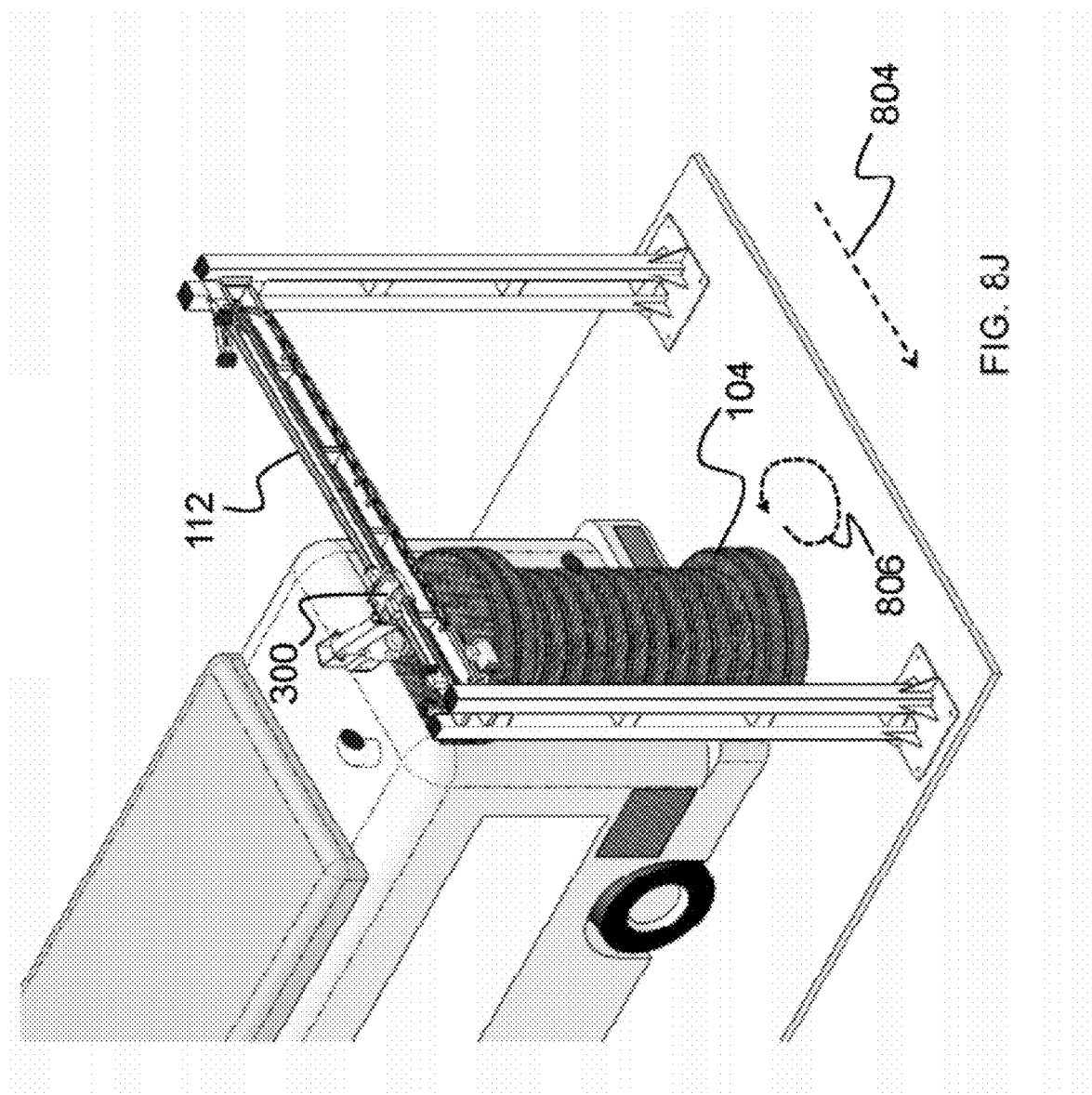

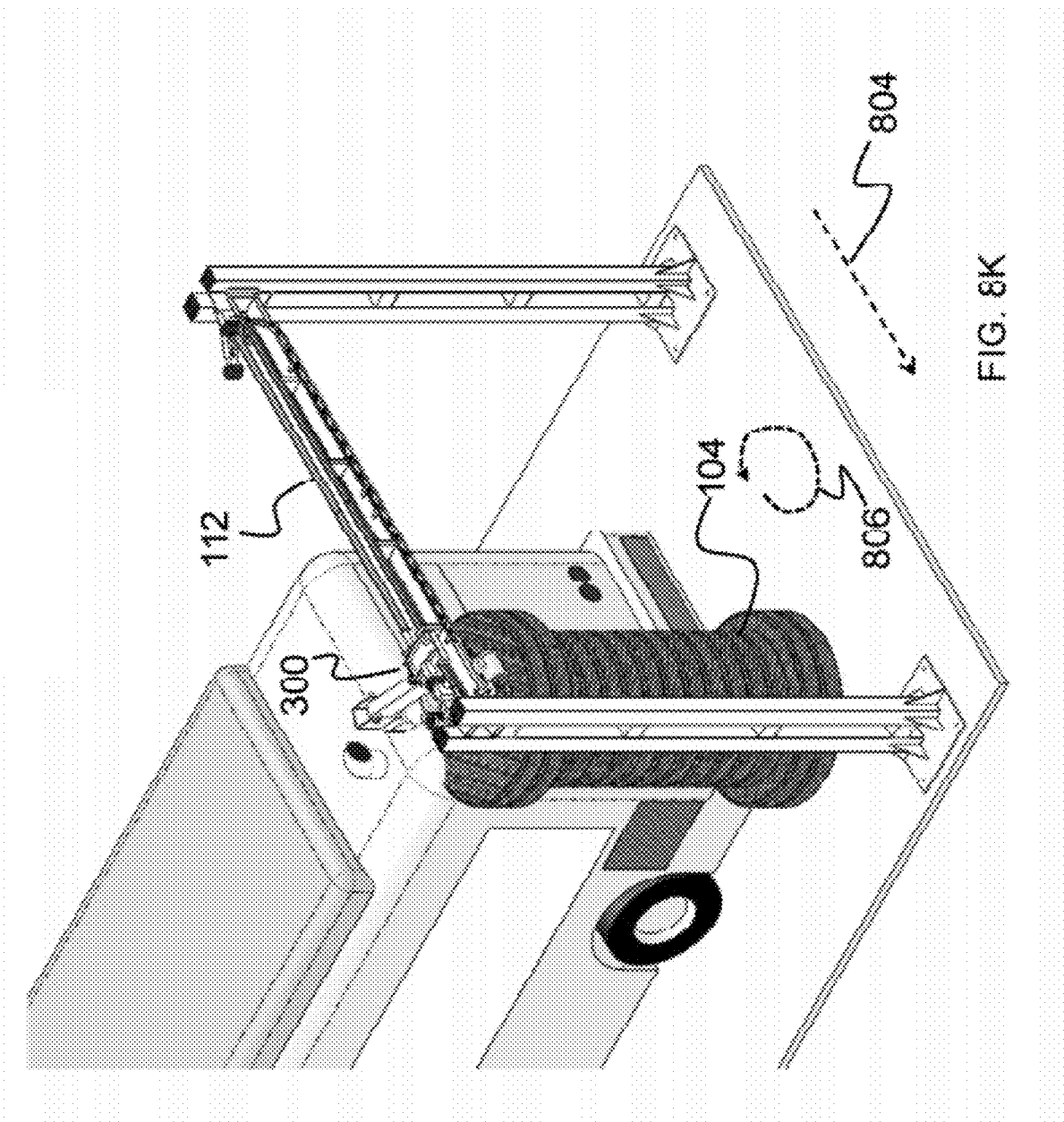

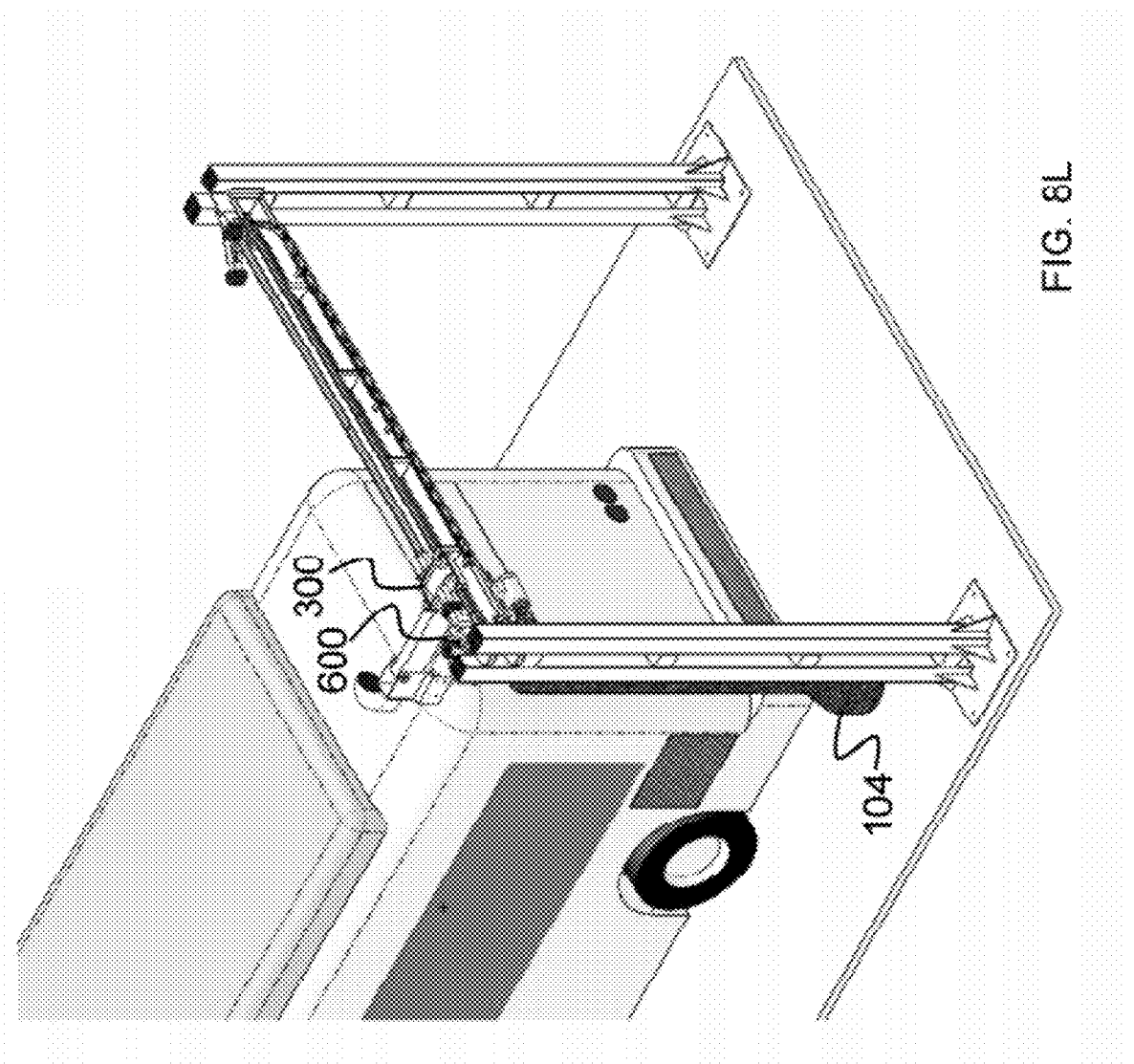

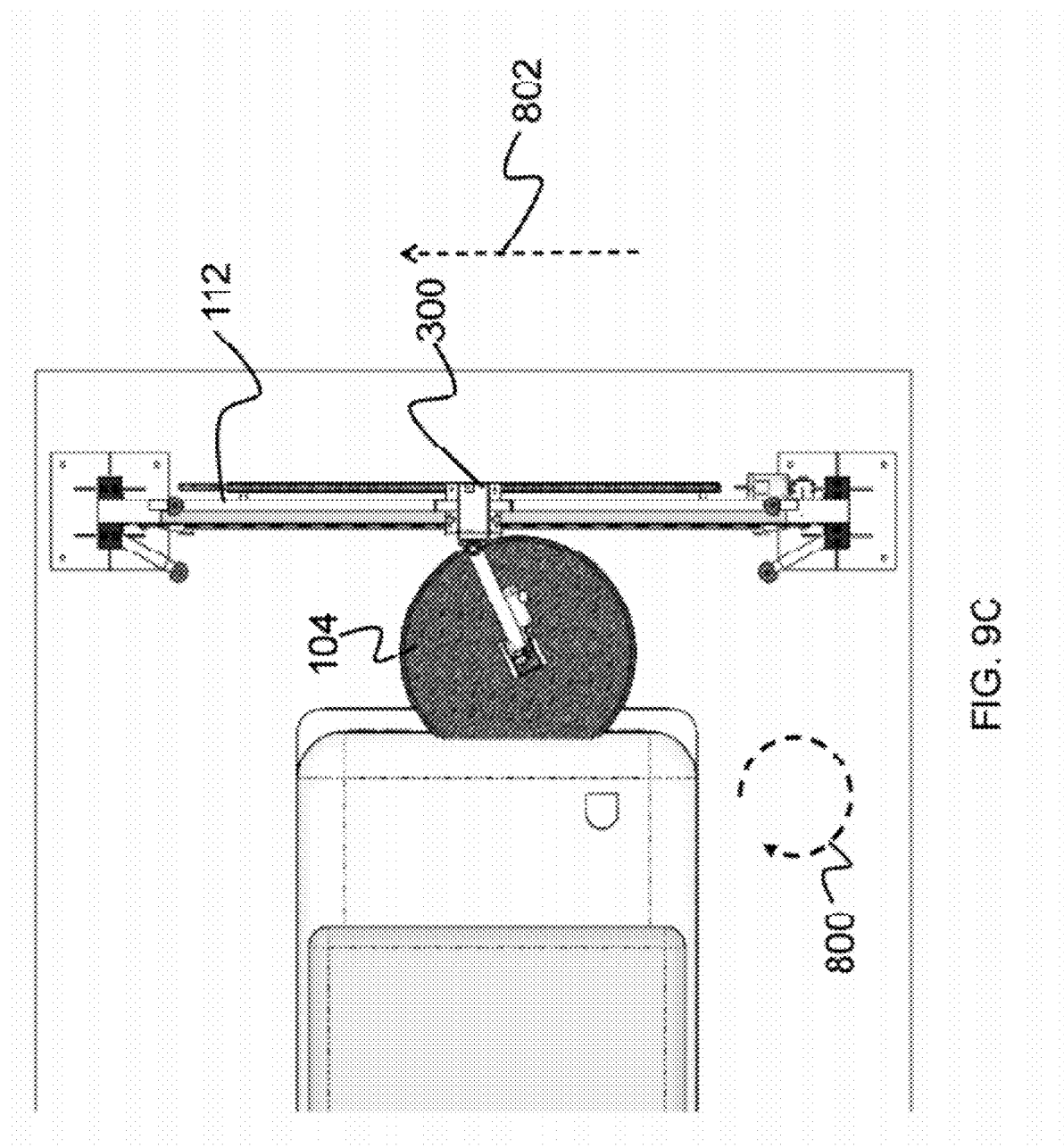

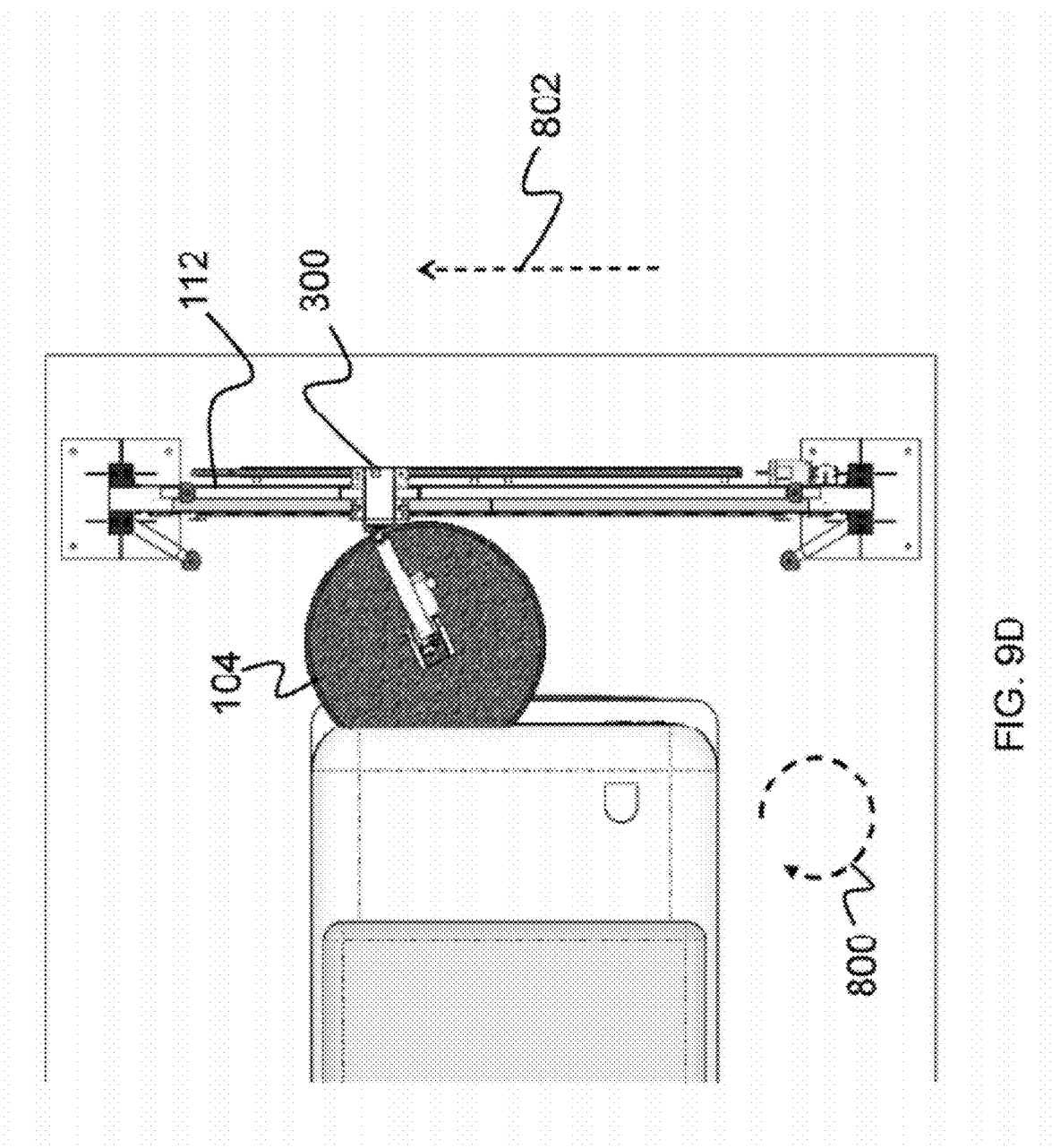

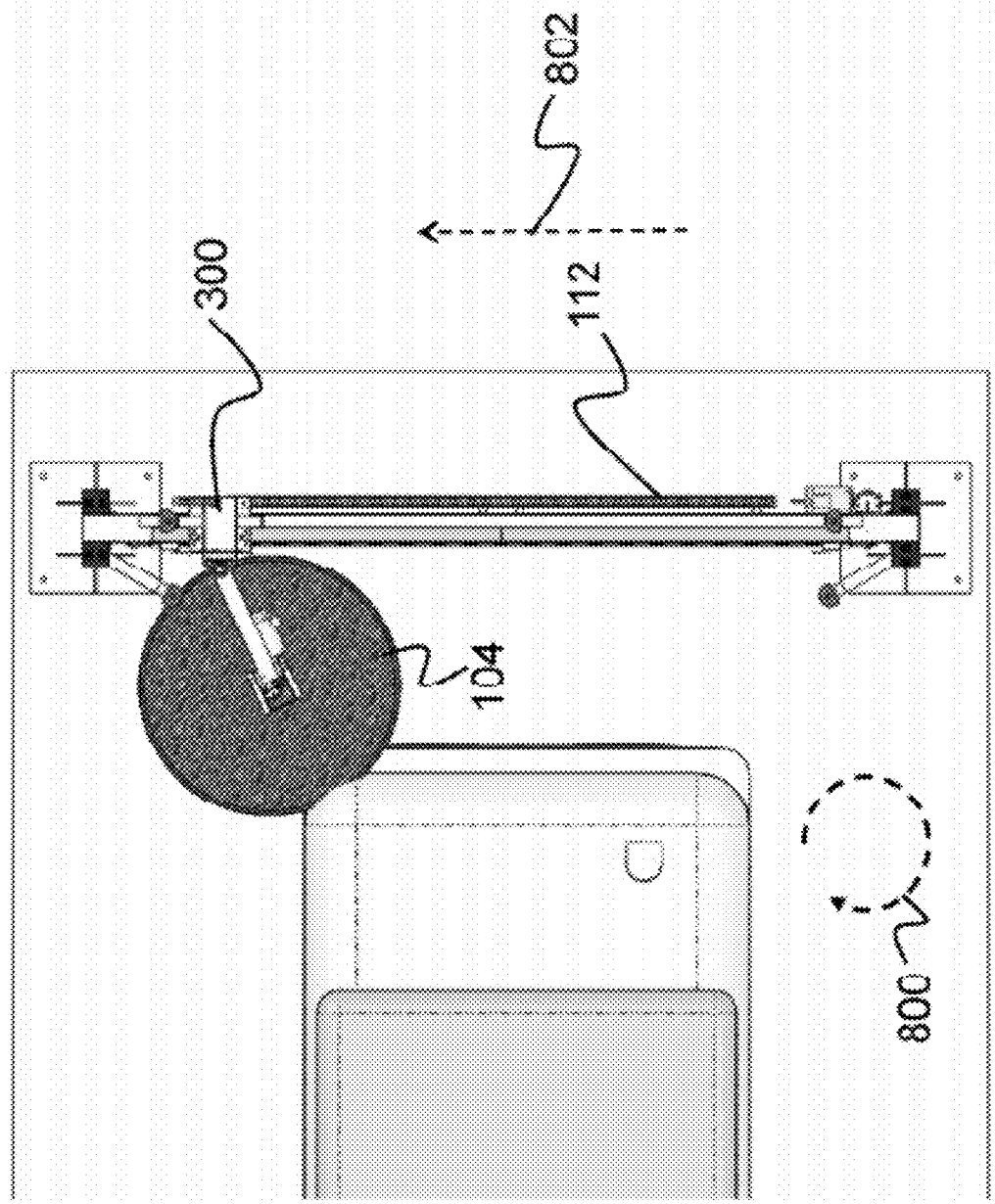

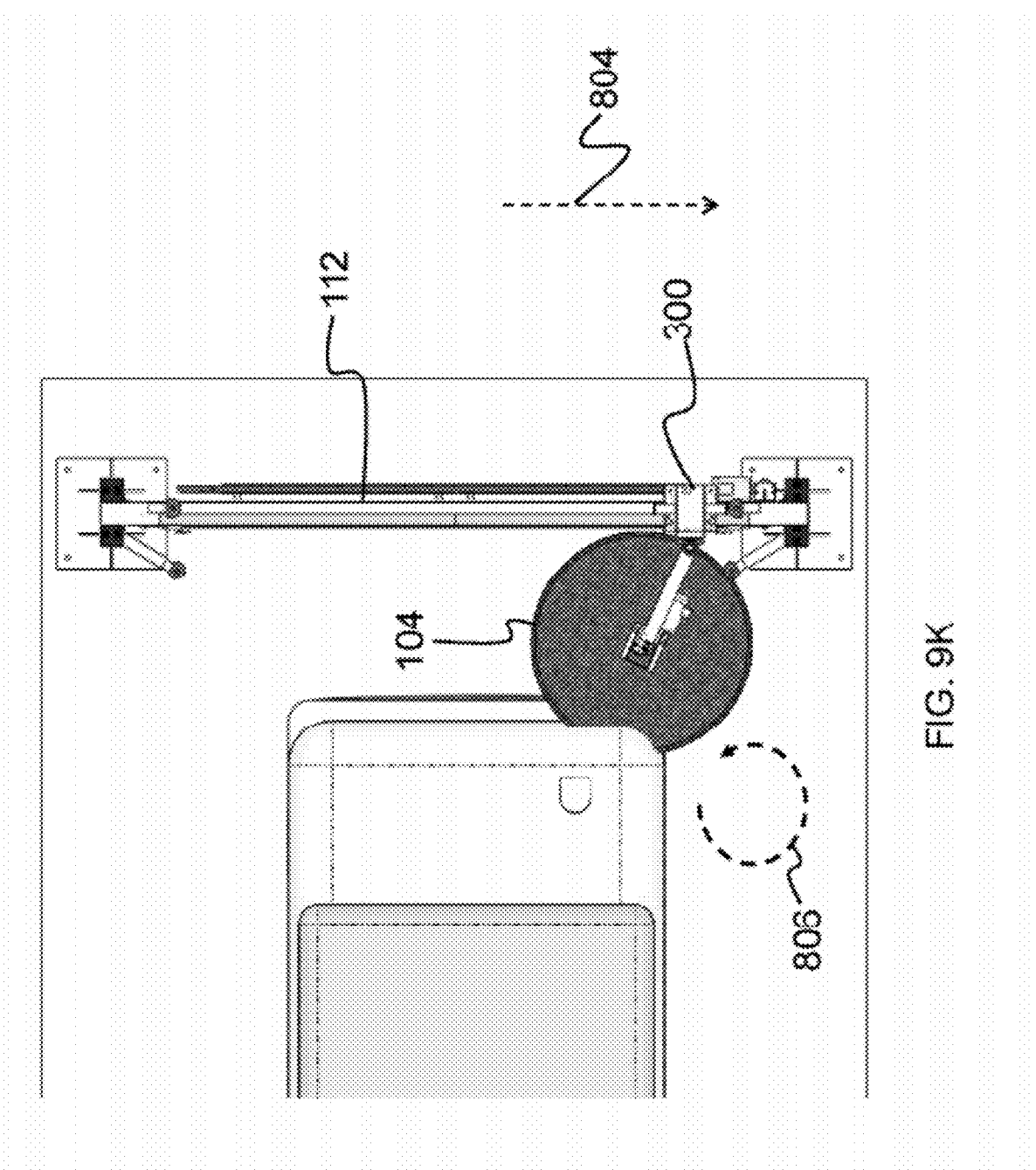

VEHICLE WASHING APPARATUS WITH A MOVABLE BRUSH ARM CARRIAGE

PRIORITY CLAIM

This is a non-provisional application of U.S. Provisional Application No. 61/415,027, filed on Nov. 18, 2010, entitled, "VEHICLE WASHING APPARATUS WITH A MOVABLE BRUSH ARM CARRIAGE."

BACKGROUND OF THE INVENTION (1) Field of Invention

The present invention relates to a vehicle washing apparatus and, more particularly, to a vehicle washing apparatus with a movable brush arm carriage that provides for lateral movement of the brush arm carriage while directing the brush toward a passing vehicle.

(2) Description of Related Art

Vehicle washing systems have long been known in the art. By way of example, automatic vehicle-washing systems are well-known and are in widespread use for washing passenger automobiles, trucks, buses, railroad equipment, and the like. A typical system includes a conveyor for moving the vehicle through the installation, and a series of power-driven brushes which are moved around the vehicle under a drenching spray of water and soap or detergent to remove dirt and grease. The washed vehicle is given a spray of clean rinse water, and is then moved to a drying station. Finally, after being washed and dried, the conveyor pushes the vehicle from the washing system.

There are a few variations of power-driven brushes that are used in standard washing systems. By way of example, a horizontally-positioned power brush can be hung in front of the vehicle. In this aspect, as the vehicle approaches the horizontally-positioned power brush, the front end of the vehicle engages with the brush. The brush can then be maneuvered across the top of and over the rear of the vehicle. Thus, a horizontally-positioned power brush is often used to wash the front, top, and rear portions of the vehicle.

Alternatively, a vertically-positioned power brush is often used to wash the sides of the vehicle. While a vertically-positioned power brush can be swung from the side to wash the rear of a vehicle, such a configuration would require many motors to control and position properly. More importantly, such a power brush would need to hang from a brush arm, which swings in from the side to wash the rear of the vehicle. Due to the arcing motion of the brush arm, a traditional vertically-positioned power brush engages with a limited point of the rear of the vehicle. Thus, a traditional vertically-positioned power brush does not provide for lateral motion across the rear of the vehicle and, as such, cannot effectively wash the rear portion of a vehicle.

Thus, a continuing need exists for a vehicle washing system with a movable brush arm carriage that provides for lateral movement of the brush arm carriage while directing the brush toward a passing vehicle to effectively wash the rear portion of the vehicle.

SUMMARY OF INVENTION

While considering the failure of others to make use of all of the above components in this technology space, the inventor unexpectedly realized that a movable brush arm carriage that provides for lateral movement of the brush arm carriage while directing the brush toward a passing vehicle would be effective in washing the rear of the vehicle without being limited to the arcing motion of a brush arm.

Thus, the present invention is directed to a vehicle washing apparatus with a movable brush arm carriage. The vehicle washing apparatus includes a carriage frame for suspending above a passing vehicle. The carriage frame has a length that is wider than a width of a passing vehicle. A brush arm carriage is slidably connected with the carriage frame. A carriage drive system is connected with the carriage frame and the brush arm carriage for causing the brush arm carriage to slide along the length of the carriage frame. Further, a brush arm is rotatably connected with the brush arm carriage, with a a cleaning brush rotatably connected with the brush arm. Finally, a brush drive system is included for causing the cleaning brush to rotate.

In another aspect, the brush arm has a brush arm axis. The brush arm is connected with the carriage frame such that an angle of incidence exists between the brush arm axis and a ground surface, with the angle of incidence being greater than zero degrees and less than 90 degrees, whereby the angle of incidence causes the cleaning brush to be gravity fed toward a passing vehicle. Additionally, the brush arm is rotatably connected with the brush arm carriage via a set of brush arm bearings and bearing brackets.

An adjustment apparatus is operably connected between the brush arm carriage and the brush arm to allow adjustments to the angle of incidence. The adjustment apparatus includes a tip plate connected between the set of bearing brackets and the brush arm carriage.

In yet another aspect, the carriage frame includes a limit switch at each end of the length of the carriage frame, such that the carriage drive system causes the brush arm carriage to leave a home position and slide along the length of the carriage frame in a first carriage direction until contacting a first limit switch, at which point the carriage drive system causes the brush arm carriage to reverse direction and slide along the length of the carriage frame in a second carriage direction until reaching a second limit switch at the home position.

Further, the brush drive system causes the cleaning brush to rotate in a first rotation direction while the brush arm carriage slides along the carriage frame in the first carriage direction, such that when the carriage drive system causes the brush arm carriage to reverse direction, the brush drive system causes the cleaning brush to reverse rotation and rotate in a second rotation direction.

In another aspect, a vehicle sensor system is included, with the vehicle sensor system configured to determine if a vehicle is stationary within range of the cleaning brush. The vehicle sensor system includes a first beam sensor and a second beam sensor. The vehicle sensor system is configured to present a stop indicator to a vehicle driver after having passed the first beam sensor, and if the vehicle does not pass the second beam sensor within a predetermined amount of time, the vehicle sensor system initiates operation of the brush arm carriage and cleaning brush. After having traveled the first carriage direction and the second carriage direction, the vehicle sensor system is configured to cease operation of the brush arm carriage and cleaning brush and present a go indicator to the vehicle driver. Additionally, while in operation, if the vehicle passes the second beam sensor, the vehicle sensor system is configured to cause the brush arm carriage to return to the home position and cease operation of the cleaning brush.

Finally, as can be appreciated by one in the art, the present invention also comprises a method for forming and using the invention described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 8A is a rear-view illustration of the vehicle washing system, depicting a bus engaged with the vehicle washing system and a brush arm carriage at a home position;

FIG. 8B is a rear-view illustration of the vehicle washing system, depicting initiation of the system with rotation of a cleaning brush and motion of the brush arm carriage across the carriage frame in a first carriage direction;

FIG. 8C is a rear-view illustration of the vehicle washing system, depicting continued rotation of the cleaning brush and motion of the brush arm carriage across the carriage frame in the first carriage direction;

FIG. 8D is a rear-view illustration of the vehicle washing system, depicting continued rotation of the cleaning brush and motion of the brush arm carriage across the carriage frame in the first carriage direction;

FIG. 8E is a rear-view illustration of the vehicle washing system, depicting continued rotation of the cleaning brush and motion of the brush arm carriage across the carriage frame in the first carriage direction;

FIG. 8F is a rear-view illustration of the vehicle washing system, depicting continued rotation of the cleaning brush and motion of the brush arm carriage across the carriage frame in the first carriage direction;

FIG. 8G is a rear-view illustration of the vehicle washing system, depicting the brush arm carriage as engaging with a limit switch and ceasing rotation of the cleaning brush;

FIG. 8H is a rear-view illustration of the vehicle washing system, depicting rotation of the cleaning brush and the brush arm carriage as reversing direction to slide along the length of the carriage frame in a second carriage direction;

FIG. 8I is a rear-view illustration of the vehicle washing system, depicting continued rotation of the cleaning brush and motion of the brush arm carriage across the carriage frame in the second carriage direction;

FIG. 8J is a rear-view illustration of the vehicle washing system, depicting continued rotation of the cleaning brush and motion of the brush arm carriage across the carriage frame in the second carriage direction;

FIG. 8K is a rear-view illustration of the vehicle washing system, depicting continued rotation of the cleaning brush and motion of the brush arm carriage across the carriage frame in the second carriage direction;

FIG. 8L is a rear-view illustration of the vehicle washing system, depicting the brush arm carriage as engaging with a limit switch after returning to a home position and ceasing rotation of the cleaning brush motion of the brush arm carriage;

FIG. 9C is a top-view illustration of the vehicle washing system, depicting continued rotation of the cleaning brush and motion of the brush arm carriage across the carriage frame in the first carriage direction;

FIG. 9D is a top-view illustration of the vehicle washing system, depicting continued rotation of the cleaning brush and motion of the brush arm carriage across the carriage frame in the first carriage direction;

FIG. 9F is a top-view illustration of the vehicle washing system, depicting continued rotation of the cleaning brush and motion of the brush arm carriage across the carriage frame in the first carriage direction;

FIG. 9K is a top-view illustration of the vehicle washing system, depicting continued rotation of the cleaning brush and motion of the brush arm carriage across the carriage frame in the second carriage direction;

DETAILED DESCRIPTION

The present invention relates to a vehicle washing apparatus and, more particularly, to a vehicle washing apparatus with a movable brush arm carriage that provides for lateral movement of the brush arm carriage while directing the brush toward a passing vehicle. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of or" "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Introduction

Figure 1:
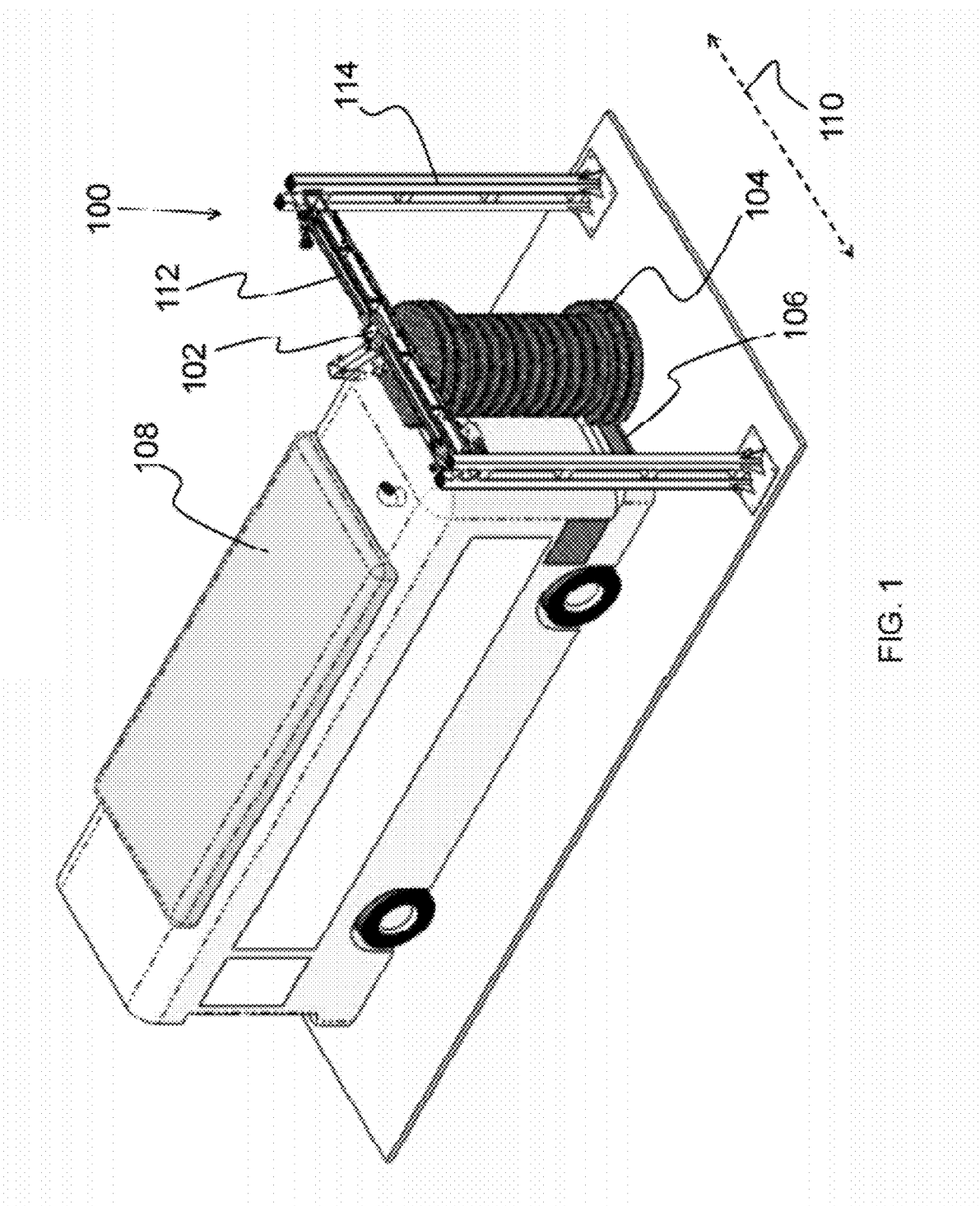
FIG. 1 is an illustration of a vehicle washing system according to the present invention, depicting a bus engaged with the vehicle washing system.

As shown in FIG. 1, the present invention is directed to a vehicle washing apparatus 100 with a movable brush arm carriage 102. An advantage to the movable brush arm carriage 102 is that a rotatable cleaning brush 104 can be effectively positioned against the rear portion 106 of a vehicle 108 to wash the back side (i.e., rear portion 106) of the vehicle 108. Through lateral movement 110 of the brush arm carriage 102, the cleaning brush 104 can be raked across the rear 106 of the vehicle 108 while not limiting contact of the cleaning brush 104 to a particular arcing action of a brush arm.

Additionally, the vehicle washing apparatus 100 improves upon the prior art through use of a vehicle sensor system that detects the presence or absence of a vehicle. Based on the presence or absence of a vehicle, the system initiates or ceases operation of the cleaning brush 104 and/or other components. Further details of the present invention are provided below.

(2) Specific Details

As noted above, the present invention is a vehicle washing apparatus 100. The vehicle washing apparatus 100 includes a carriage frame 112 for suspending above a passing vehicle 108. The carriage frame 112 can be suspended using any suitable technique for suspending/raising such a frame, a non-limiting example of which includes being attached with side supports 114. As another non-limiting example, the carriage frame 112 can be attached to opposing walls, or hung from a ceiling.

Figure 2:
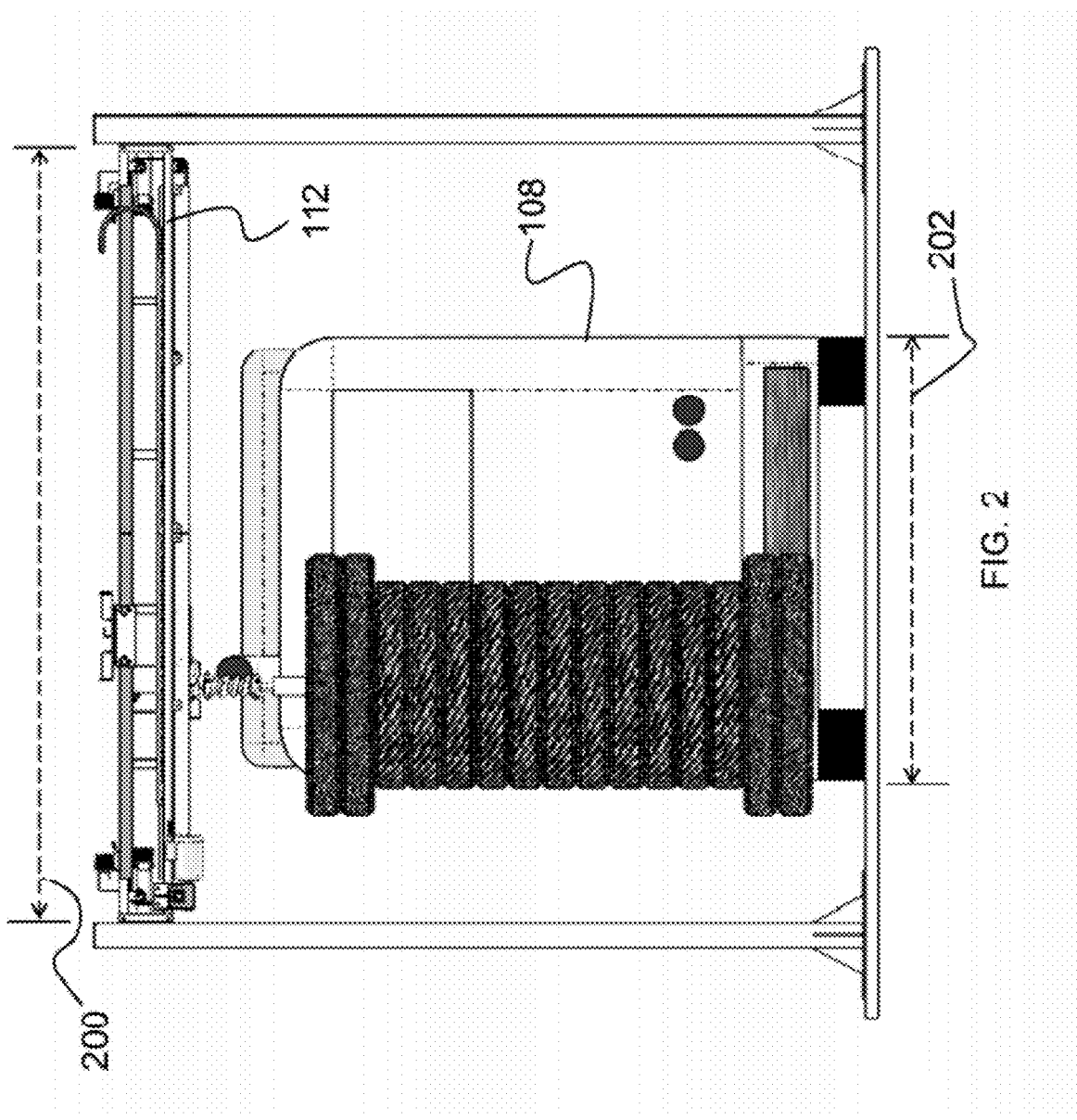
FIG. 2 is a rear-view illustration of the vehicle washing system, depicting a bus engaged with the vehicle washing system.

As shown in FIG. 2, the carriage frame 112 has a length 200 that is wider than a width 202 of a passing vehicle 108. Thus, the carriage frame 112 is formed to accommodate a variety of passing vehicles, depending on the particular application. As a non-limiting example, if the passing vehicle 108 is a bus, the carriage frame 112 is between 5 feet and 20 feet long. Alternatively, if the passing vehicle 108 is a car, the carriage frame 112 is between 5 and 15 feet. In either configuration, the carriage frame 112 is positioned at a suitable height and includes a suitable length 200 to allow the vehicle 108 to pass beneath the carriage frame 112.

Figure 3:
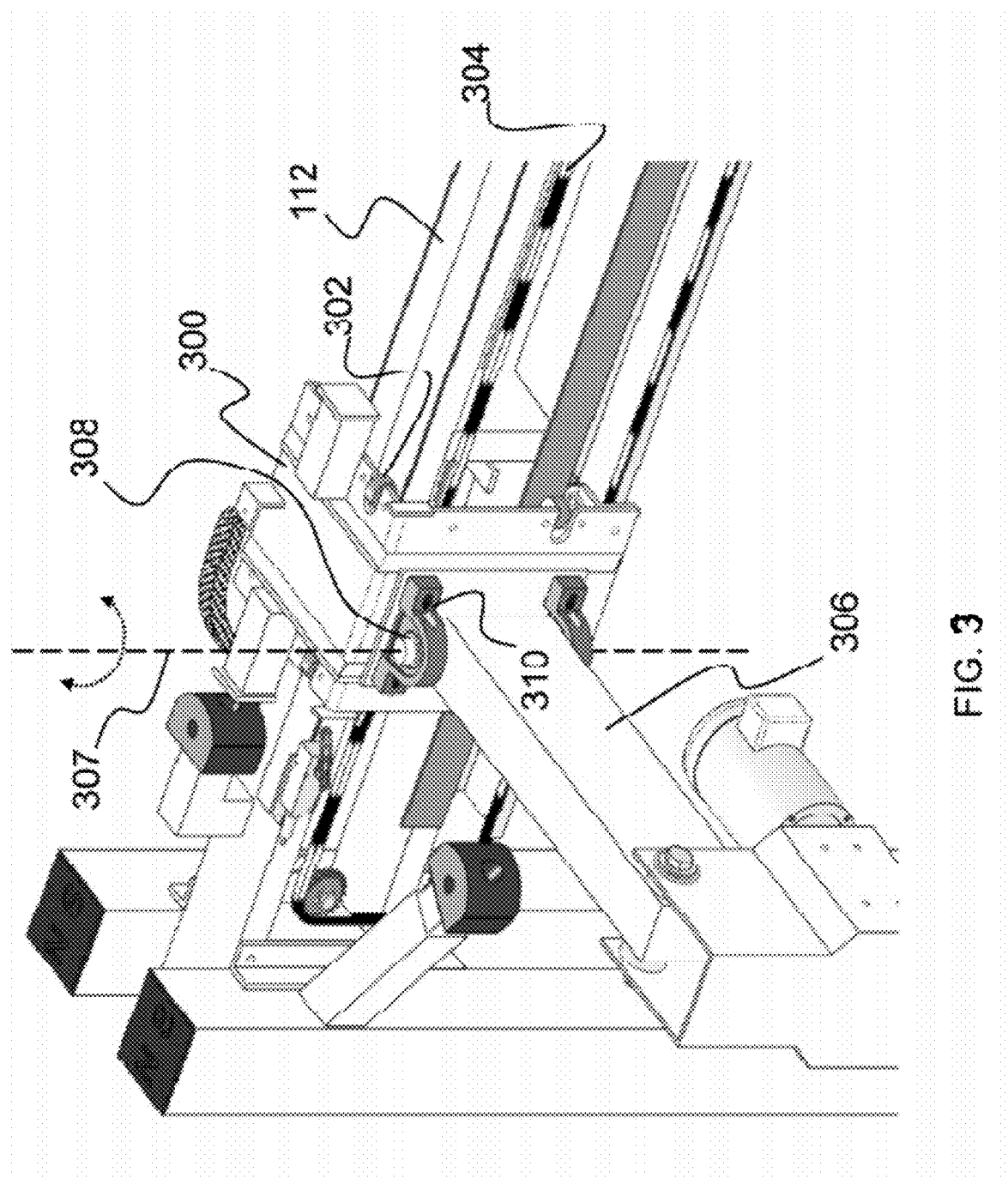
FIG. 3 is a close-up view illustration of a carriage frame, brush arm carriage, and brush arm.

The carriage frame 112 serves as a frame to provide for operation of the attached vehicle washing apparatus components. For example and as shown in FIG. 3, a brush arm carriage 300 is movably (e.g., slidably) connected with the carriage frame 112. For example, the brush arm carriage 300 is wrapped around the carriage frame 112 and includes a series of roller 302 to allow it to slide along the length of the carriage frame 112. A suitable carriage drive system is connected with the brush arm carriage 300 to cause the brush arm carriage 300 to move along the length of the carriage frame 112. As a non-limiting example, the carriage drive system includes a carriage motor (described in further detail below) that drives a chain/belt 304 that causes the brush arm carriage 300 to slide along the length of the carriage frame 112.

Holding the cleaning brush is a brush arm 306. While the cleaning brush can be attached directly to the brush arm carriage 300, it is desirable to attach the cleaning brush with a brush arm 306, with the brush arm 306 connected with the brush arm carriage 300. Further, the brush arm 306 can be attached with the brush arm carriage 300 using any suitable technique. For example, the brush arm can be fixedly attached with the carriage 300. Alternatively and in a desirable configuration, the brush arm 306 is rotatably connected with the brush arm carriage 300 to allow the brush arm 306 to rotate about a brush arm axis 307. Such a connection can be accomplished with brush arm bearings 308 and bearing brackets 310. Thus, the bearing bracket 310 is connected to the carriage 300, while the bearing brackets 310 and brush arm bearings 308 hold the brush arm 306.

Figure 4:
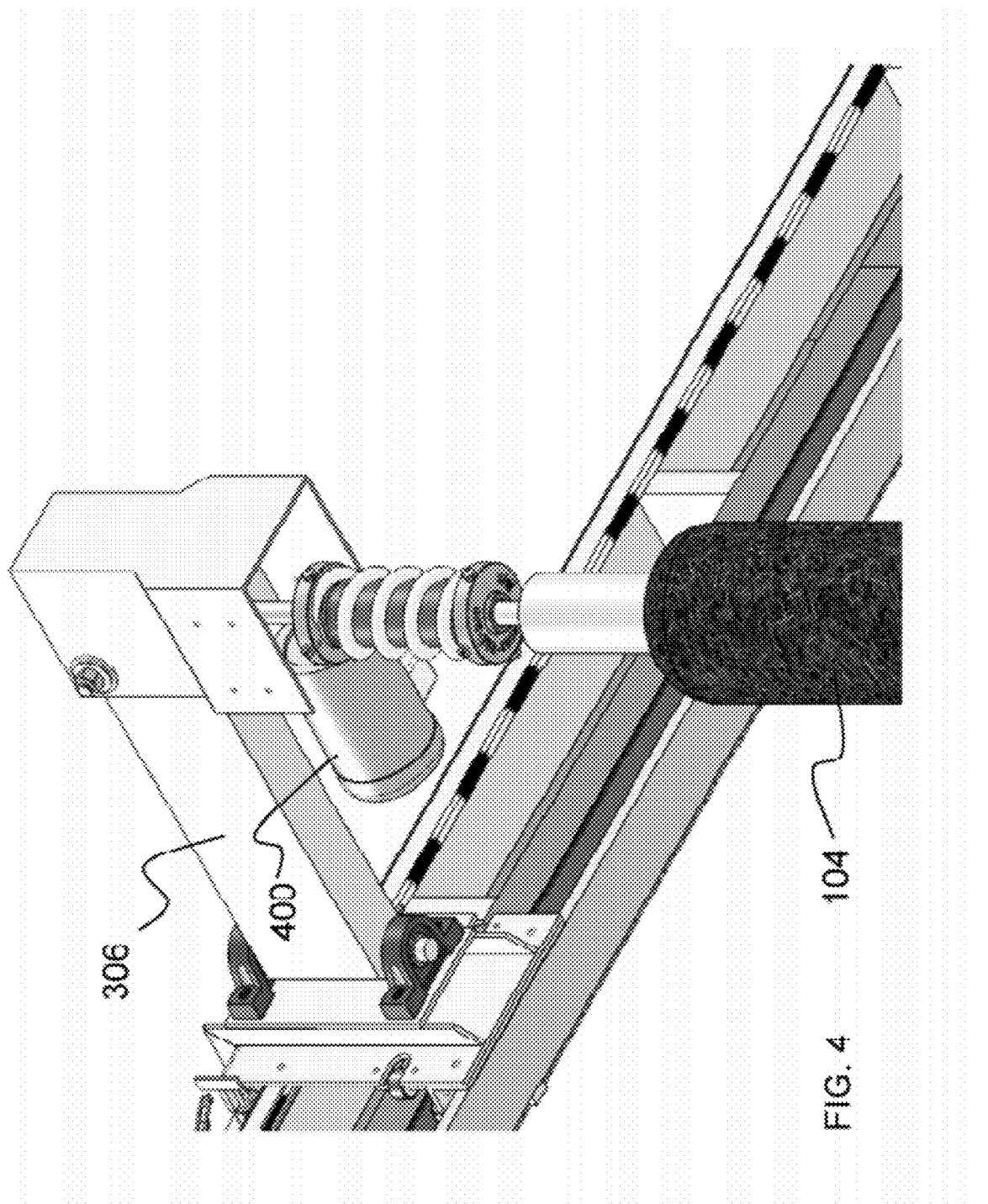
FIG. 4 is a close-up view illustration of a cleaning brush attached with the brush arm and brush arm carriage.

As shown in FIG. 4, a cleaning brush 104 is connected with the brush arm 306. While the cleaning brush 104 can be attached with the brush arm 306 such that it does not rotate, a more effective and desirable configuration is to have the cleaning brush 104 rotatably connected to the brush arm 306. For example, a brush drive system 400 (e.g., motor) is attached with the cleaning brush 104 to cause the cleaning brush 104 to rotate. The cleaning brush 104 is any suitable brush mechanism for washing a passing vehicle. As a non-limiting example, the cleaning brush 104 is a vertically-mounted spinning brush, with brush bristles that spread out as the brush rotates (via centrifugal force). Such a brush is commonly used in commercial vehicle washing systems.

Figure 5:
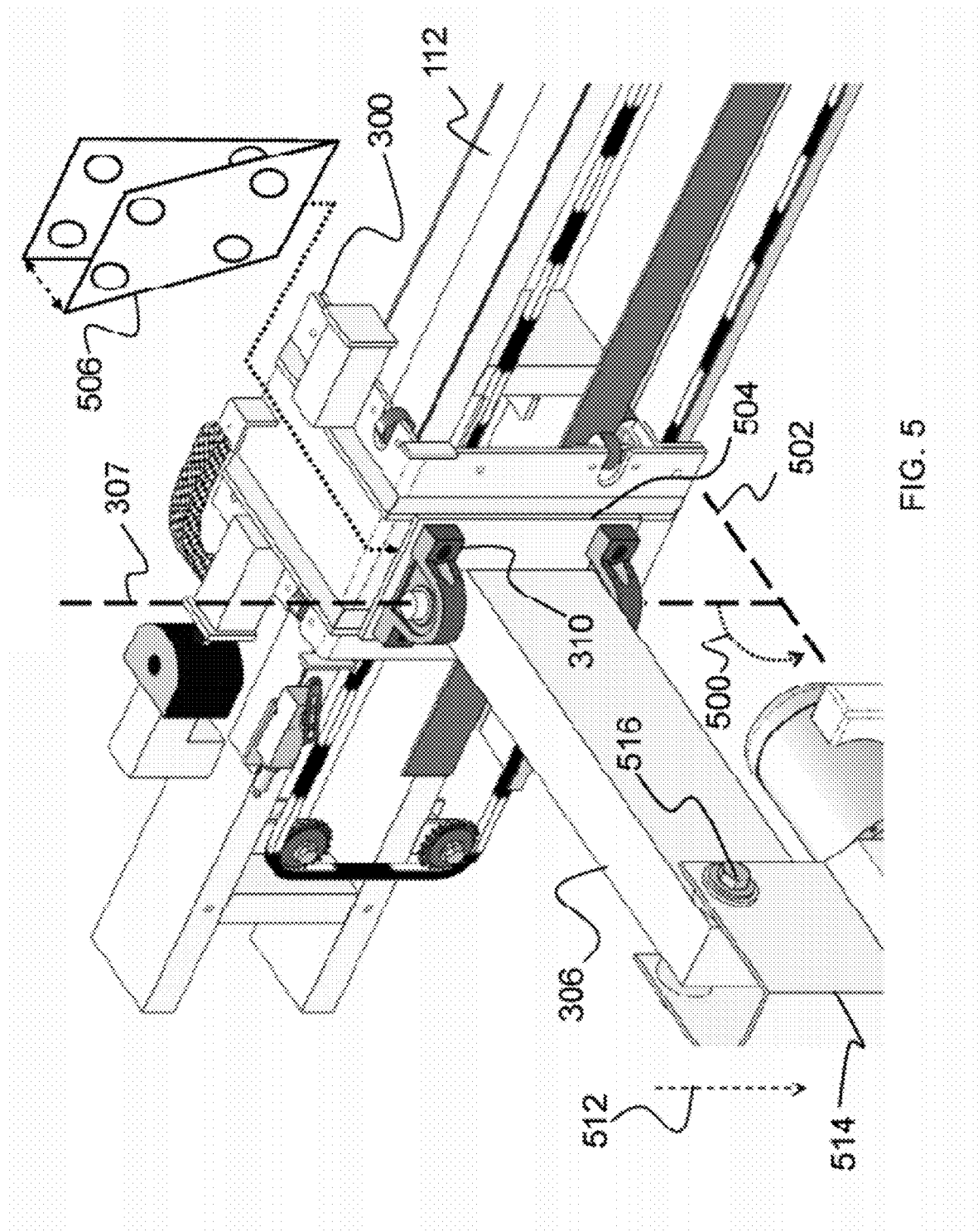
FIG. 5 is a close-up view illustration of the carriage frame and brush arm.

To assist the cleaning brush 104 with engaging with a passing vehicle, the angle of the brush arm 306 can be altered to cause the cleaning brush 104 to be gravity fed toward a passing vehicle. For example and as shown in FIG. 5, the brush arm 306 has a brush arm axis 307. The brush arm 306 is connected with the carriage frame 112 such that an angle of incidence 500 exists between the brush arm axis 307 and a ground surface 502. The angle of incidence 500 is a measure of deviation of something from "straight on." For example, in the approach of a ray to a surface. As applicable to the present invention and as noted above, the angle of incidence 500 is a measure of deviation from a "straight on" approach of the brush arm axis 307 to the ground surface 502. Or stated in another manner, the deviation from being perpendicular to the ground surface 502. Thus, the brush arm 306 can be mounted such that the angle of incidence 500 is zero. Alternatively, the brush arm 306 can be mounted such that the angle of incidence 500 is greater than zero degrees and less than 90 degrees. Thus, by increasing the angle of incidence 500 of the brush arm 306, an attached cleaning brush will constantly be fed forward via gravity toward a passing vehicle. In this aspect, a brush can naturally move in and out with contours of the vehicle while applying pressure to the surface of the vehicle. The ability to move in and out with the contours of the vehicle is enhanced due to the connection between brush arm 306 and the cleaning brush. For example, a brush arm bracket 514 can be pivotally connected 516 with the brush arm 306, with the cleaning brush hanging from the brush arm bracket 514. Thus, through use of the pivotal connection 516 of the brush arm bracket 514, the cleaning brush can easily move in and out with the contours of a vehicle.

The angle of incidence 500 can be altered using a variety of techniques. For example, the brush arm carriage 300 has a mounting platform 504 upon which the bush bearing brackets 310 are mounted. The mounting platform 504 can be formed at an angle to alter the angle of incidence 500. As another non-limiting example, an adjustment apparatus 506 can be connected between the brush arm carriage 300 and the brush arm 306 to allow adjustments to the angle of incidence 500. In this aspect, the adjustment apparatus 506 can be a tip plate that is positioned between the bearing brackets 310 and the brush arm carriage 300 (i.e., the mounting platform 504). The tip plate is an angled plate that, when positioned between the bearing brackets 310 and the mounting platform 504, drops 512 the tip of the brush arm 306 and increases the angle of incidence 500. By tightening bearing brackets 310 against the tip plate, the drop 512 is decreased, which affects the angle of incidence 500.

Figure 6:
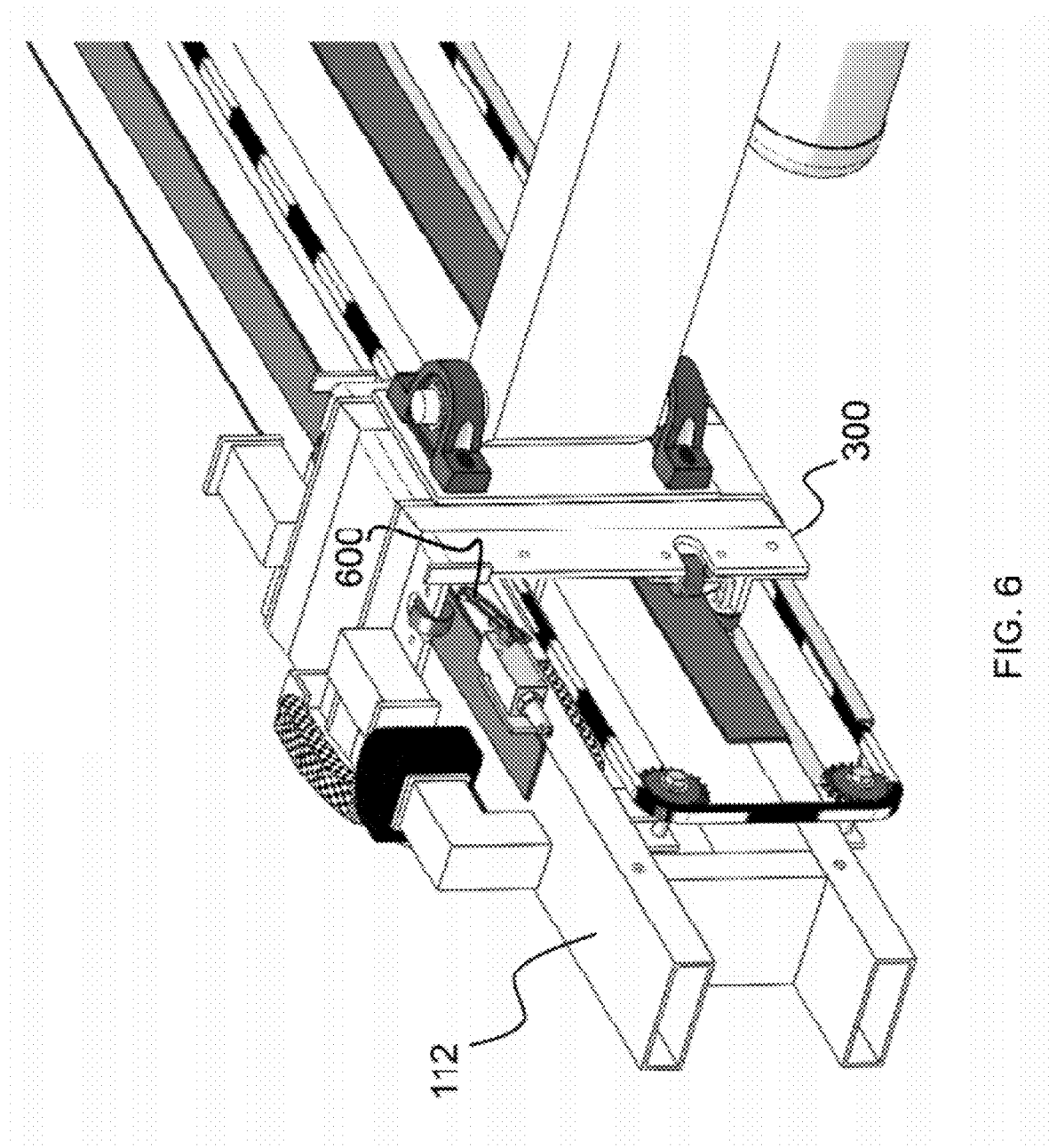
FIG. 6 is an illustration of the carriage frame and a first limit switch.

As noted above, the brush arm carriage 300 is formed to slide along the length of the carriage frame 112. Thus, the vehicle washing apparatus is configured to cause the brush arm carriage 300 to travel back and forth along the carriage frame 112 between predetermined limits of travel (such as a first and second limit of travel). As can be appreciated by one skilled in the art, there are numerous techniques to limit the motion of an object and cause it to reverse direction. As a non-limiting example, the carriage frame 112 includes a set of limit switches at each end of the carriage frame 112. For example and as shown in FIG. 6, a first limit switch 600 is attached to the carriage frame 112. The first limit switch 600 is electronically connected with the carriage drive system such that when the carriage frame 112 contacts the first limit switch 600, the carriage drive system causes the carriage frame 112 to stop and reverse direction (or stop altogether, depending on the limit switch and desired configuration).

Figure 7:
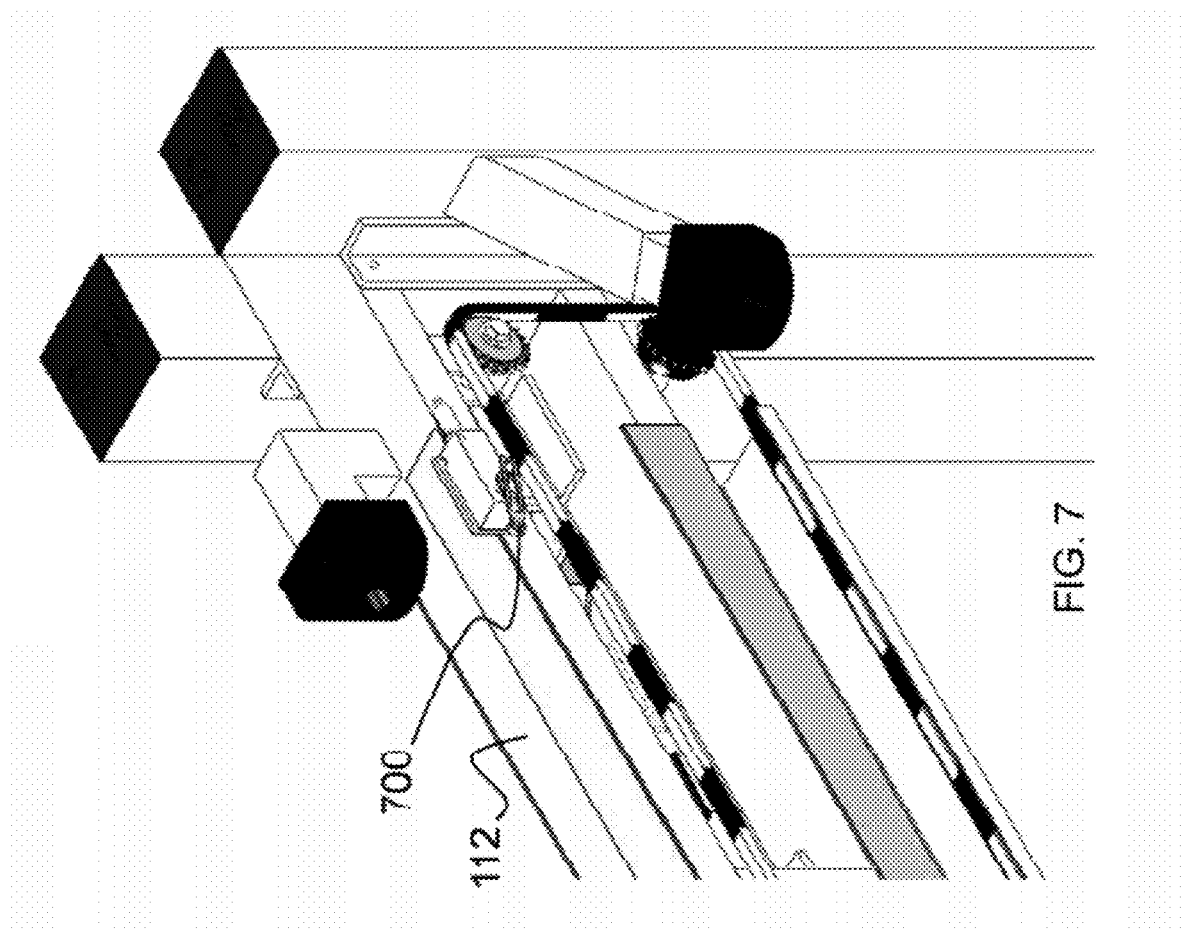
FIG. 7 is an illustration of the carriage frame and a second limit switch.

As shown in FIG. 7, a second limit switch 700 is attached to the carriage frame 112. Thus, the carriage drive system causes the brush arm carriage to leave a home position and slide along the length of the carriage frame 112 in a first carriage direction until contacting the first limit switch (shown as element 600 in FIG. 6), at which point the carriage drive system causes the brush arm carriage to reverse direction and slide along the length of the carriage frame in a second carriage direction until reaching the second limit switch 700 at the home position.

Additionally, the brush drive system causes the cleaning brush to rotate in a first rotation direction while the brush arm carriage slides along the carriage frame 112 in the first carriage direction. Alternatively, when the carriage drive system causes the brush arm carriage to reverse direction, the brush drive system causes the cleaning brush to reverse rotation and rotate in a second rotation direction.

For further understanding, FIGS. 8A through 8L depict a perspective-view of the first and second directional movements of the brush arm carriage 300 and cleaning brush 104. For example, FIG. 8A depicts the vehicle washing apparatus 100 with the brush arm carriage 300 at a home position. The home position is a start position at which the brush arm carriage 300 is stationary and the cleaning brush 104 is immobile. FIGS. 8B through 8F depict rotation of the cleaning brush 104 in a first rotation direction 800 as the brush arm carriage 300 moves across the carriage frame 112 in the first carriage direction 802. As shown in FIG. 8G, the brush arm carriage 300 engages with the first limit switch 600. Upon engaging with the first limit switch 600, the brush drive system reverses rotation of the cleaning brush 104 and the carriage drive system reverses direction to cause the brush arm carriage 300 to travel along the carriage frame in a second direction 804. Thus, FIGS. 8H through 8K depict rotation of the cleaning brush 104 in the second rotation direction 806 as the brush arm carriage 300 moves across the carriage frame 112 in the second carriage direction 804. Finally, as shown in FIG. 8L, as the brush arm carriage 300 engages with the second limit switch 700, the carriage drive system and the brush drive system cease operation, thereby stopping motion of the brush arm carriage 300 and the cleaning brush 104 as the brush arm carriage 300 returns to the home position.

Figure 9A:
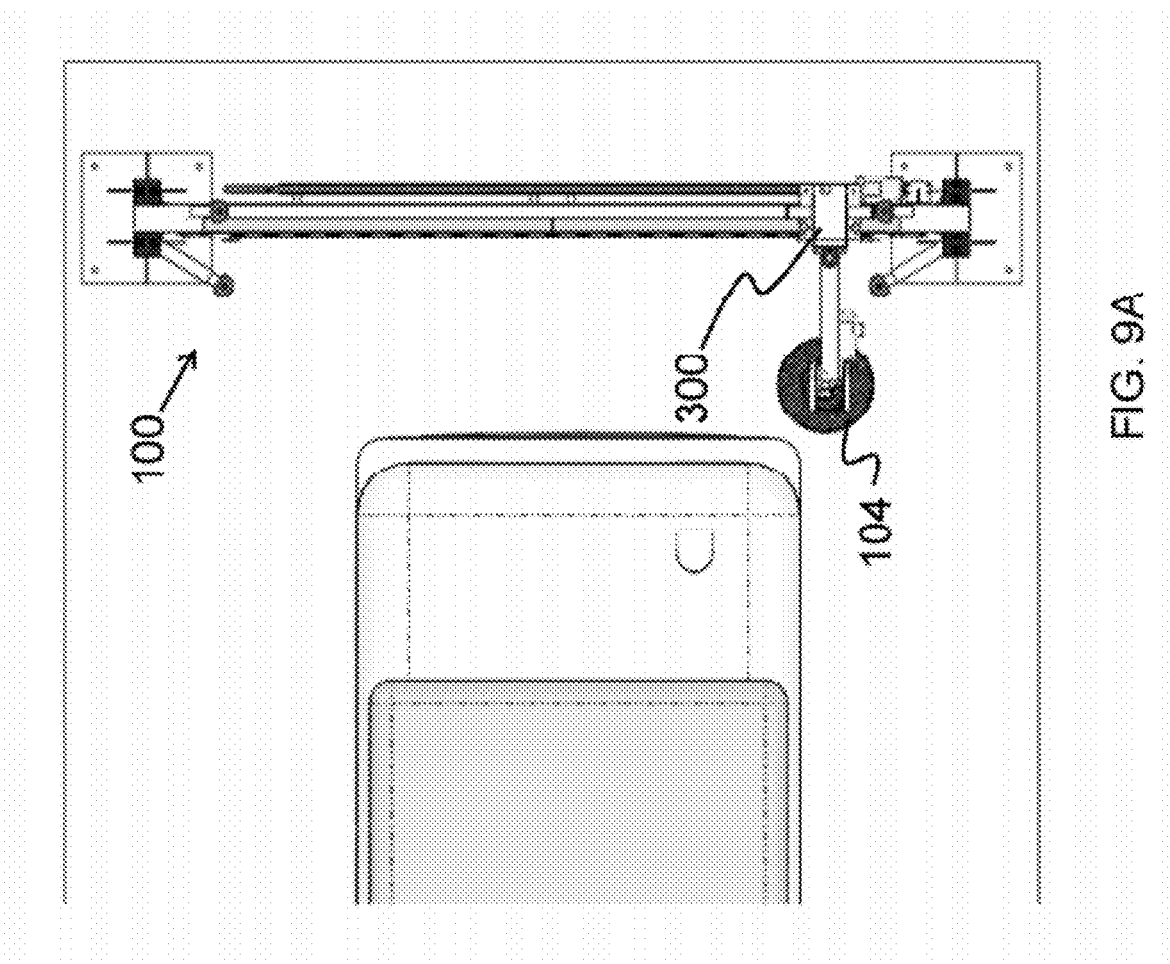
FIG. 9A is a top-view illustration of the vehicle washing system, depicting a bus engaged with the vehicle washing system and the brush arm carriage at the home position.
Figure 9B:
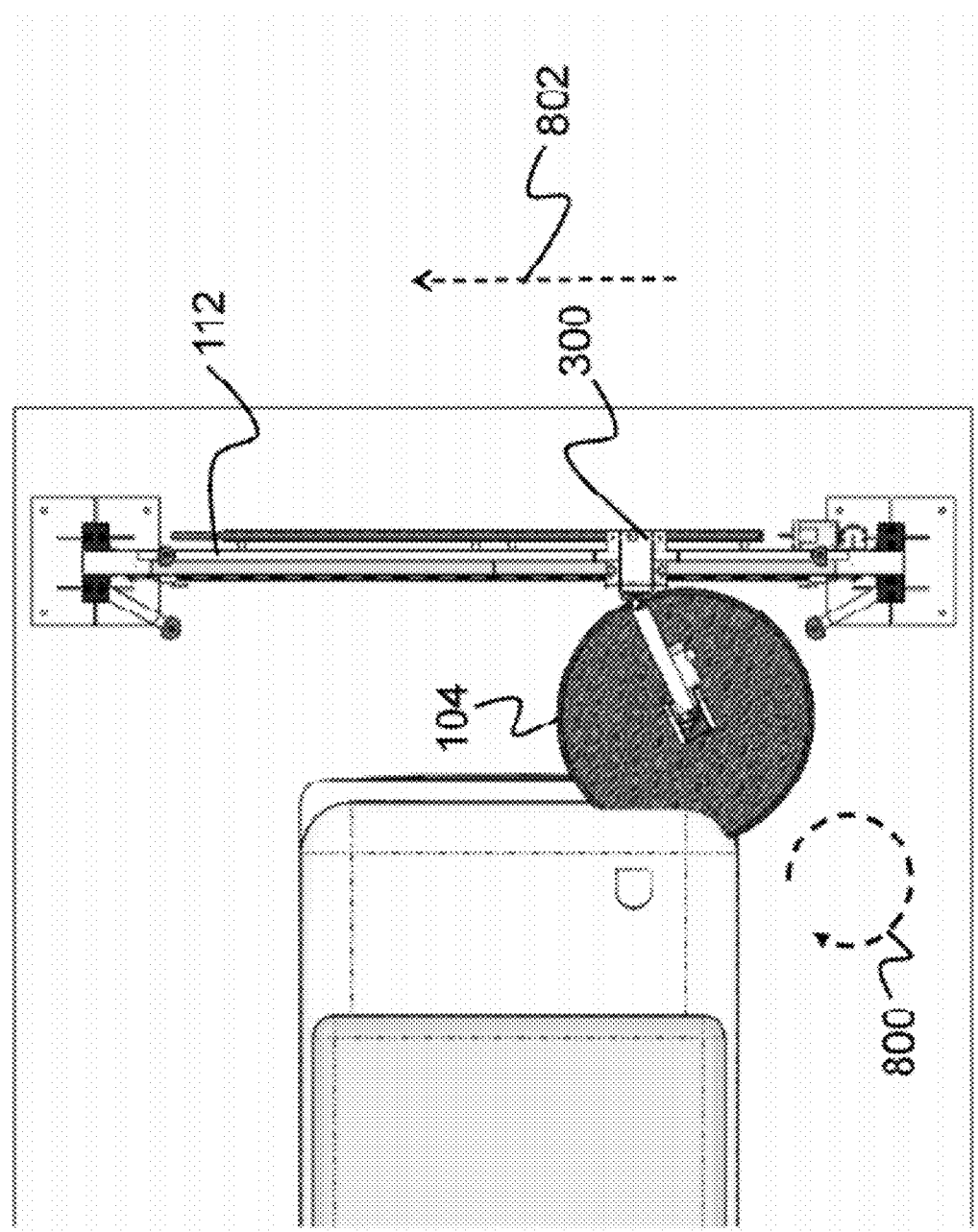
FIG. 9B is a top-view illustration of the vehicle washing system, depicting initiation of the system with rotation of the cleaning brush and motion of the brush arm carriage across the carriage frame in the first carriage direction.
Figure 9E:
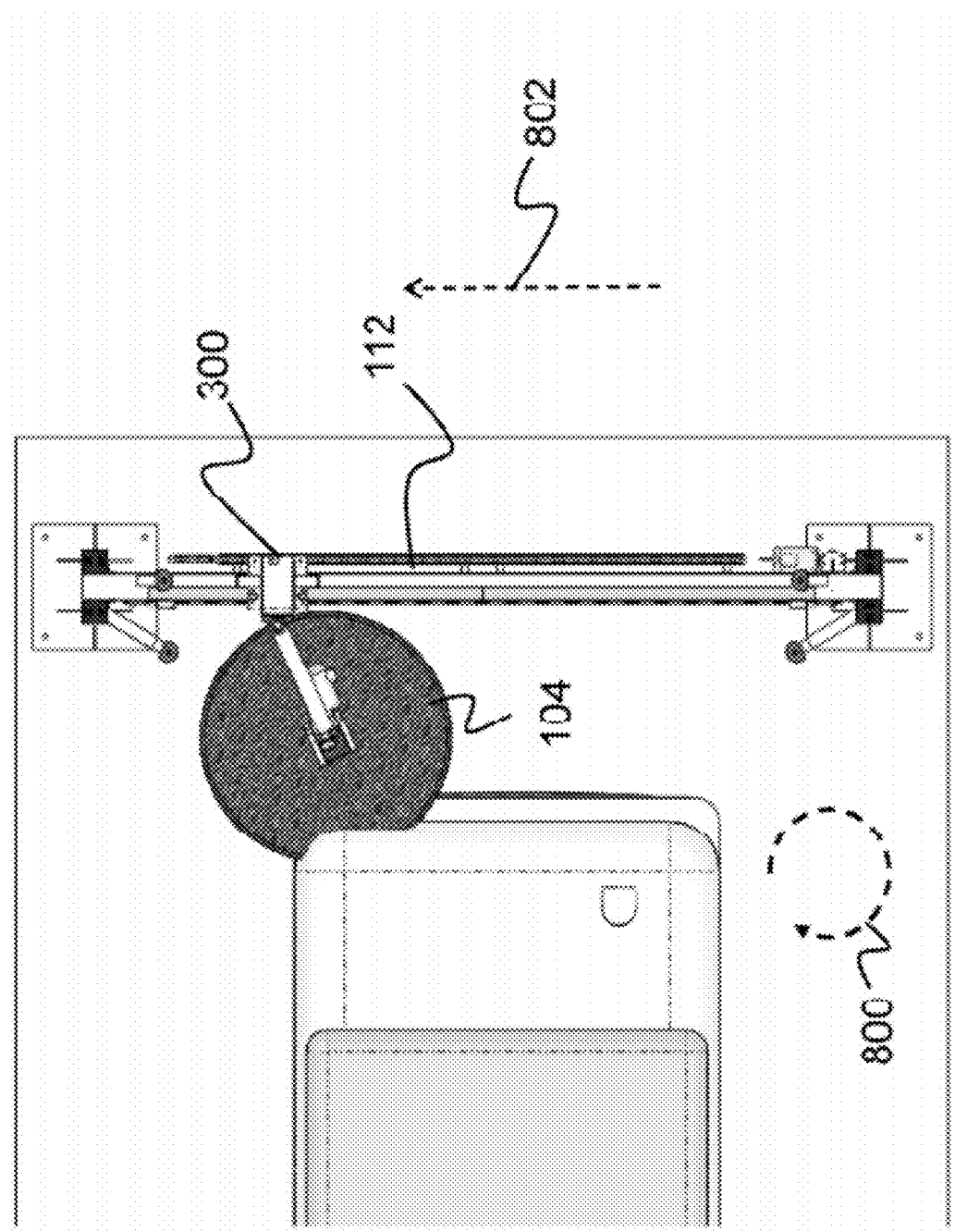
FIG. 9E is a top-view illustration of the vehicle washing system, depicting continued rotation of the cleaning brush and motion of the brush arm carriage across the carriage frame in the first carriage direction.
Figure 9G:
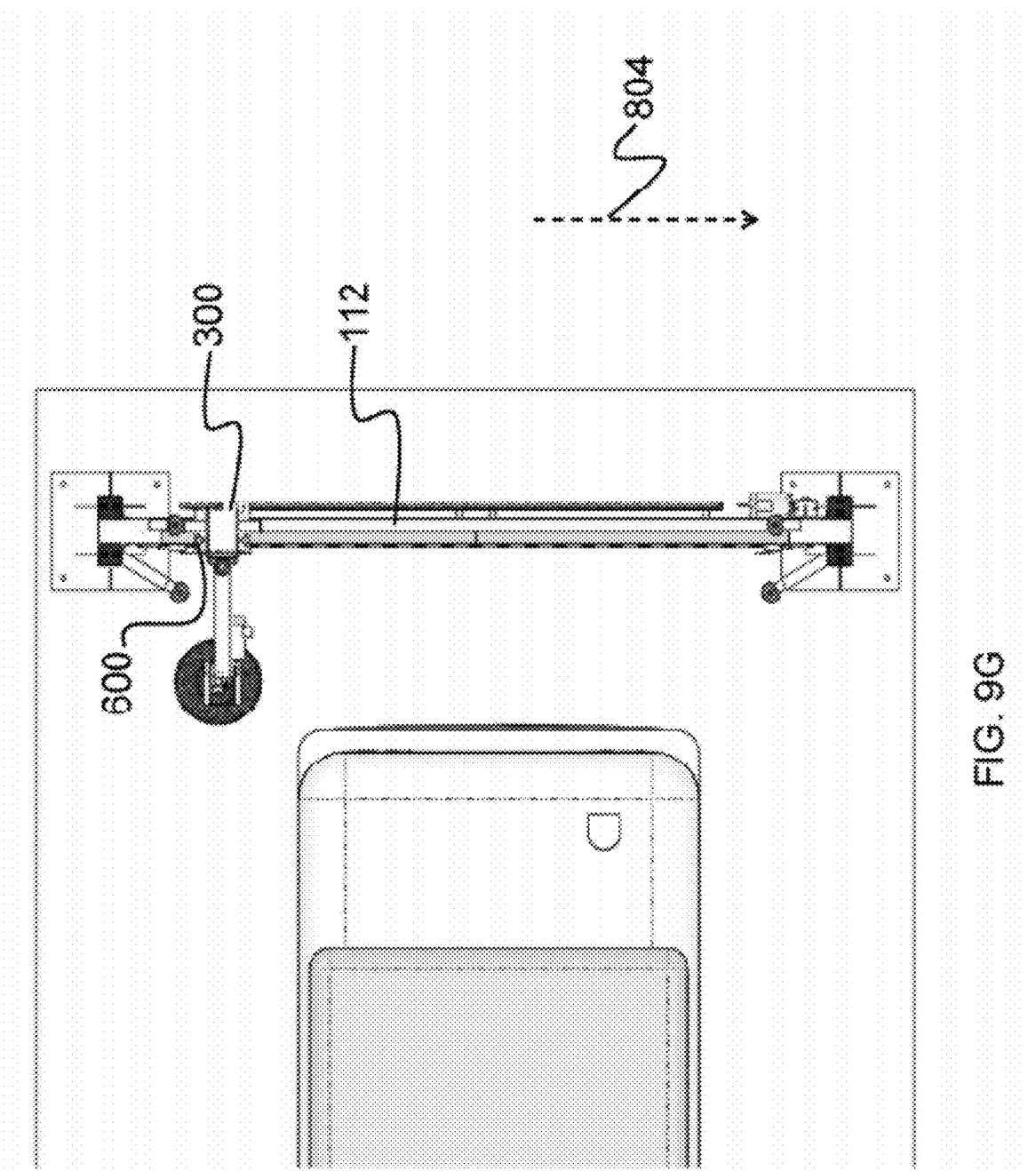
FIG. 9G is a top-view illustration of the vehicle washing system, depicting the brush arm carriage as engaging with a limit switch and ceasing rotation of the cleaning brush.
Figure 9H:
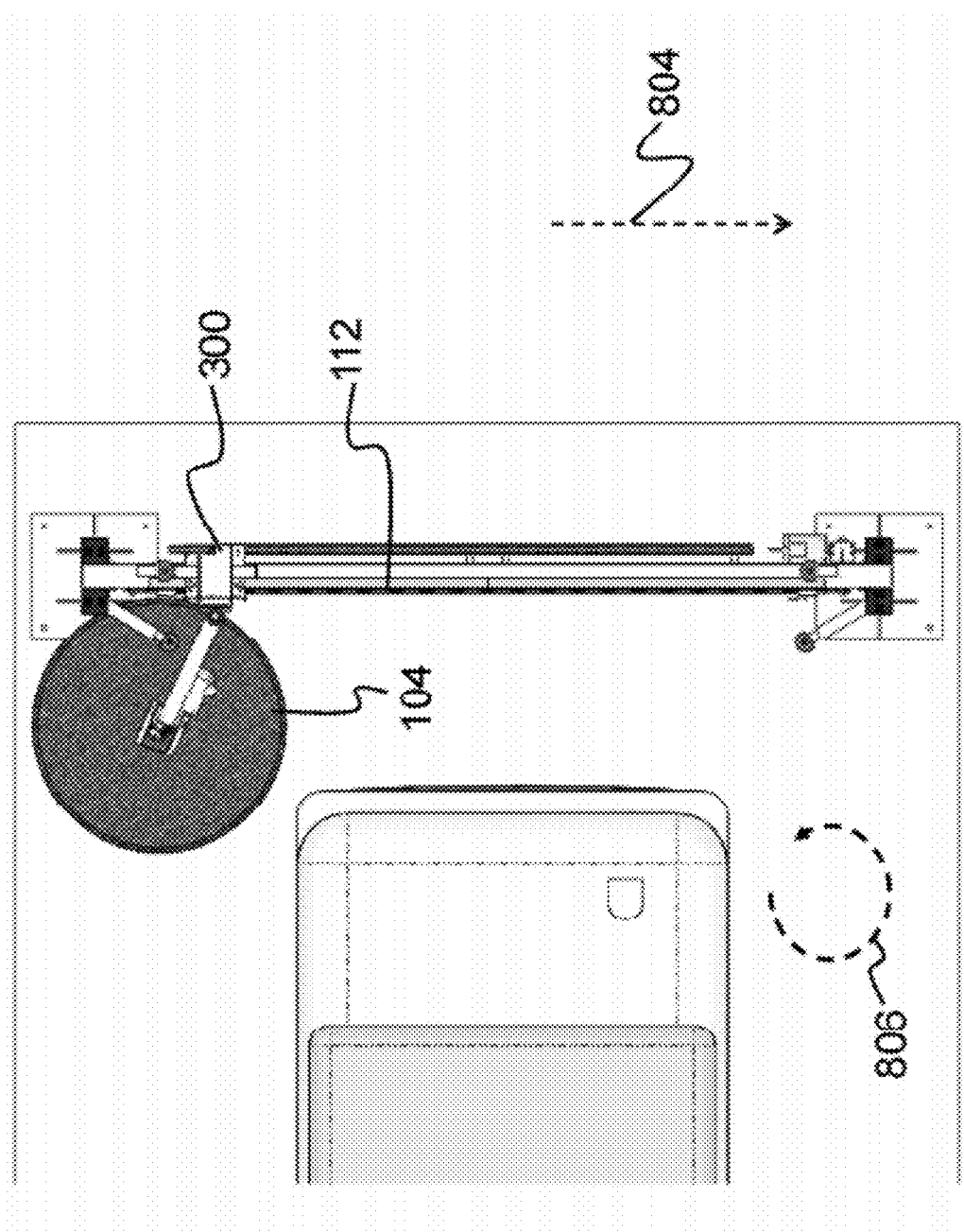
FIG. 9H is a top-view illustration of the vehicle washing system, depicting rotation of the cleaning brush and the brush arm carriage as reversing direction to slide along the length of the carriage frame in a second carriage direction.
Figure 9I:
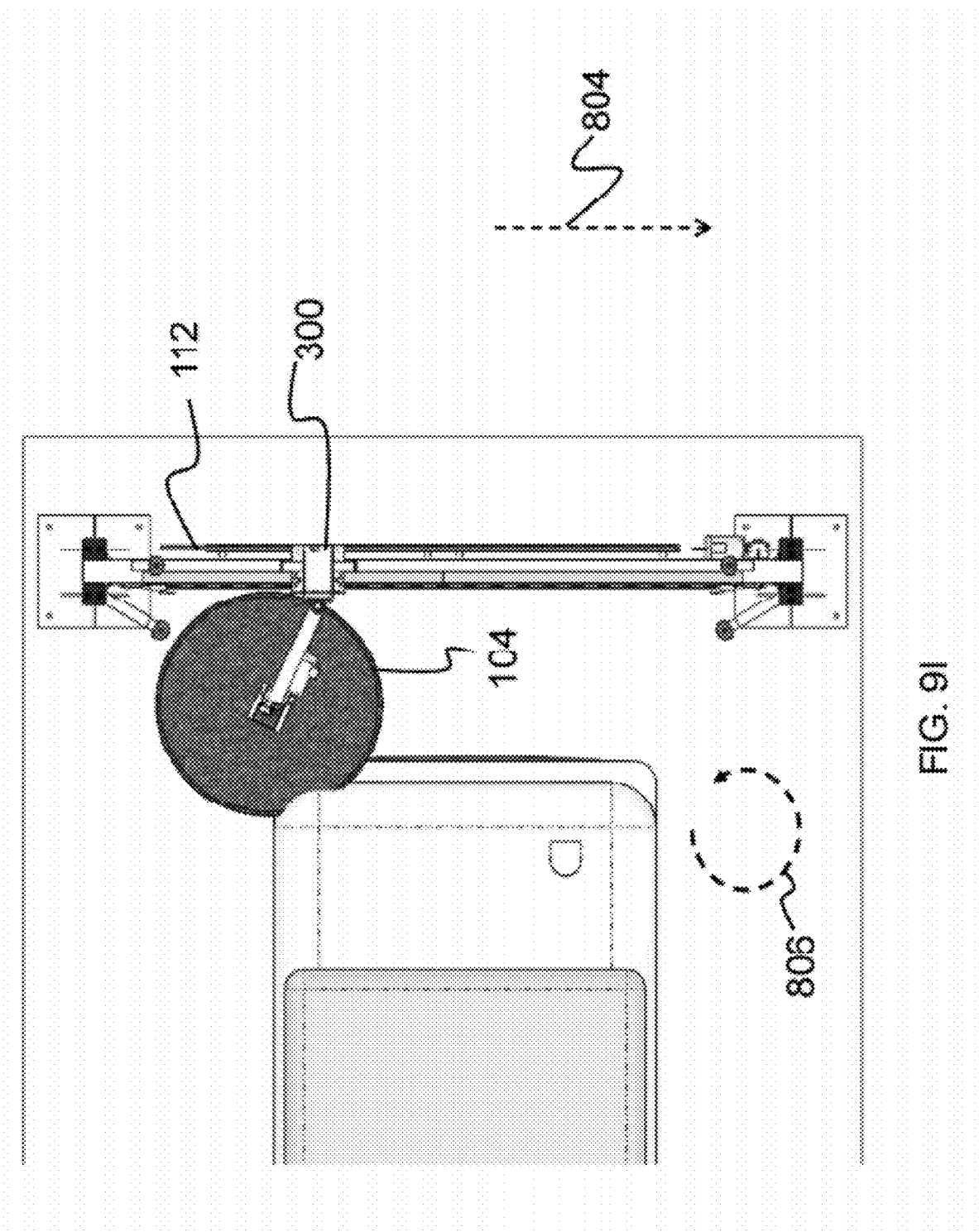
FIG. 9I is a top-view illustration of the vehicle washing system, depicting continued rotation of the cleaning brush and motion of the brush arm carriage across the carriage frame in the second carriage direction.
Figure 9J:
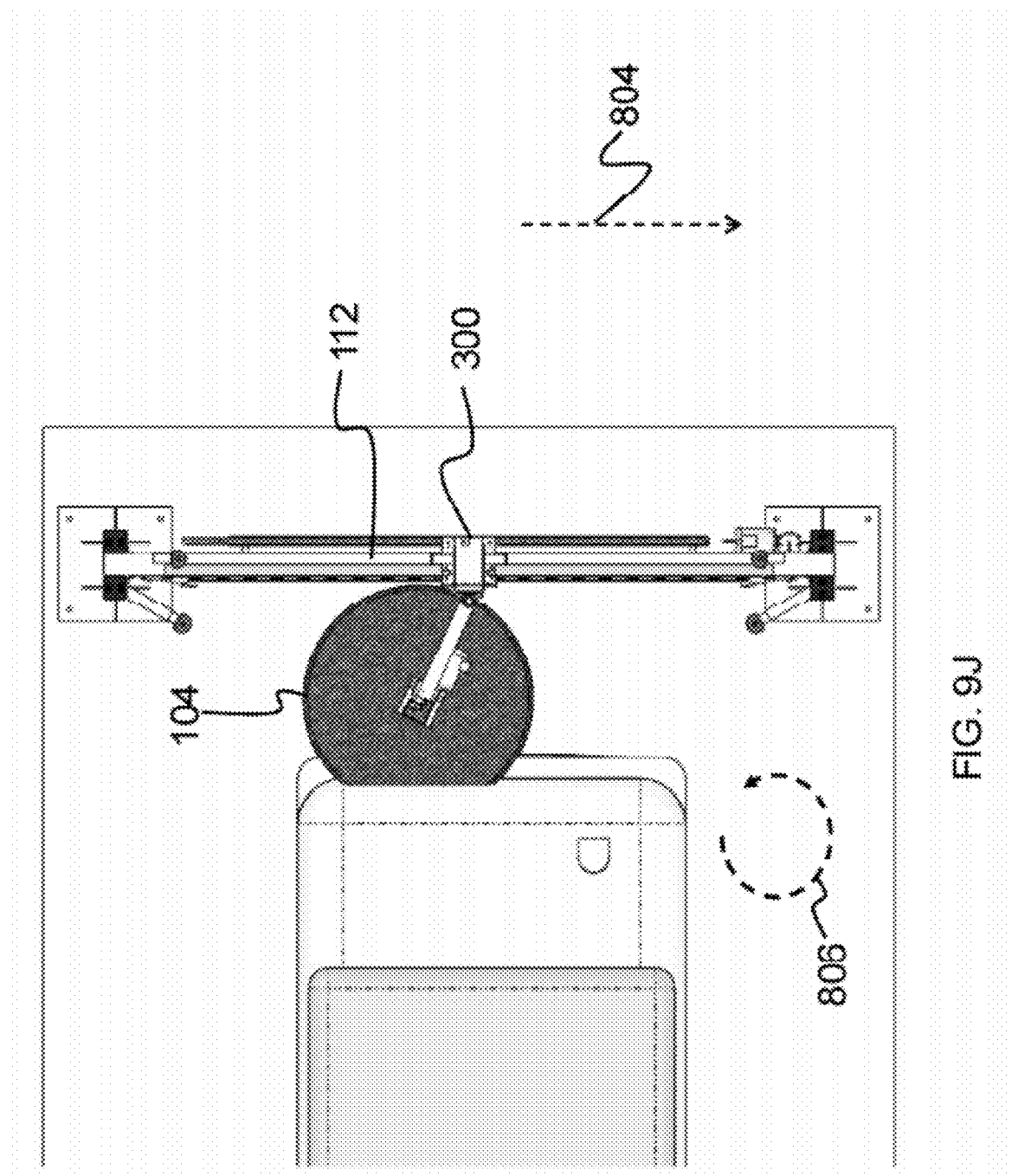
FIG. 9J is a top-view illustration of the vehicle washing system, depicting continued rotation of the cleaning brush and motion of the brush arm carriage across the carriage frame in the second carriage direction.
Figure 9L:
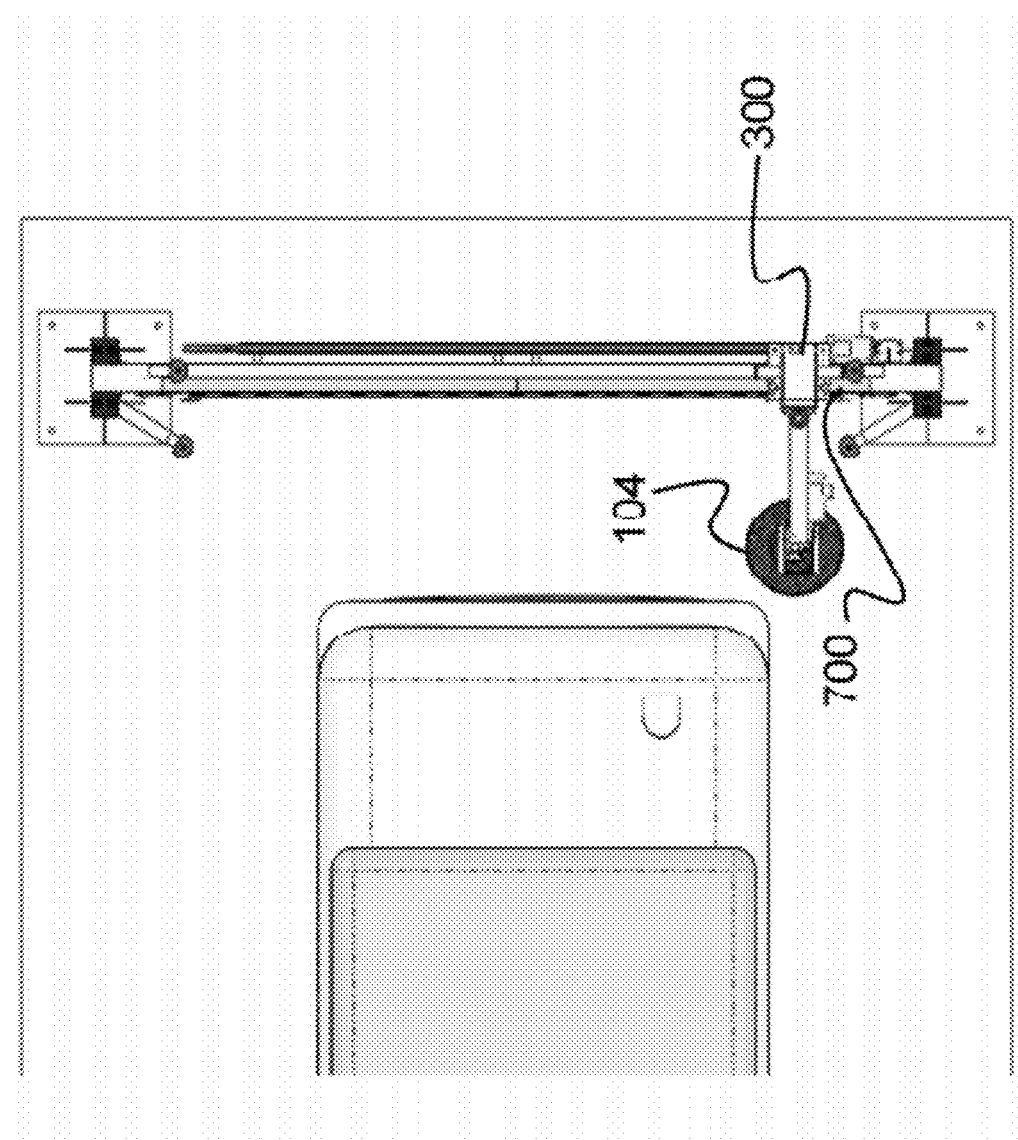
FIG. 9L is a top-view illustration of the vehicle washing system, depicting the brush arm carriage as engaging with a limit switch after returning to a home position and ceasing rotation of the cleaning brush motion of the brush arm carriage.

As another perspective, FIGS. 9A through 9L depict a top-view of the first and second directional movements of the brush arm carriage 300 and cleaning brush 104. For example, FIG. 9A depicts the vehicle washing apparatus 100 with the brush arm carriage 300 at a home position. FIGS. 9B through 9F depict rotation of the cleaning brush 104 in a first rotation direction 800 as the brush arm carriage 300 moves across the carriage frame 112 in the first carriage direction 802. As shown in FIG. 9G, the brush arm carriage 300 engages with the first limit switch 600. Upon engaging with the first limit switch 600, the brush drive system reverses rotation of the cleaning brush 104 to cause the brush arm carriage 300 to reverse direction and travel along the carriage frame in a second direction 804. Thus, FIGS. 9H through 9K depict rotation of the cleaning brush 104 in the second rotation direction 806 as the brush arm carriage 300 moves across the carriage frame 112 in the second carriage direction 804. Finally, as shown in FIG. 9L, as the brush arm carriage 300 engages with the second limit switch 700, the carriage drive system and the brush drive system cease operation, thereby stopping motion of the brush arm carriage 300 and the cleaning brush 104 as the brush arm carriage 300 returns to the home position.

Figure 10:
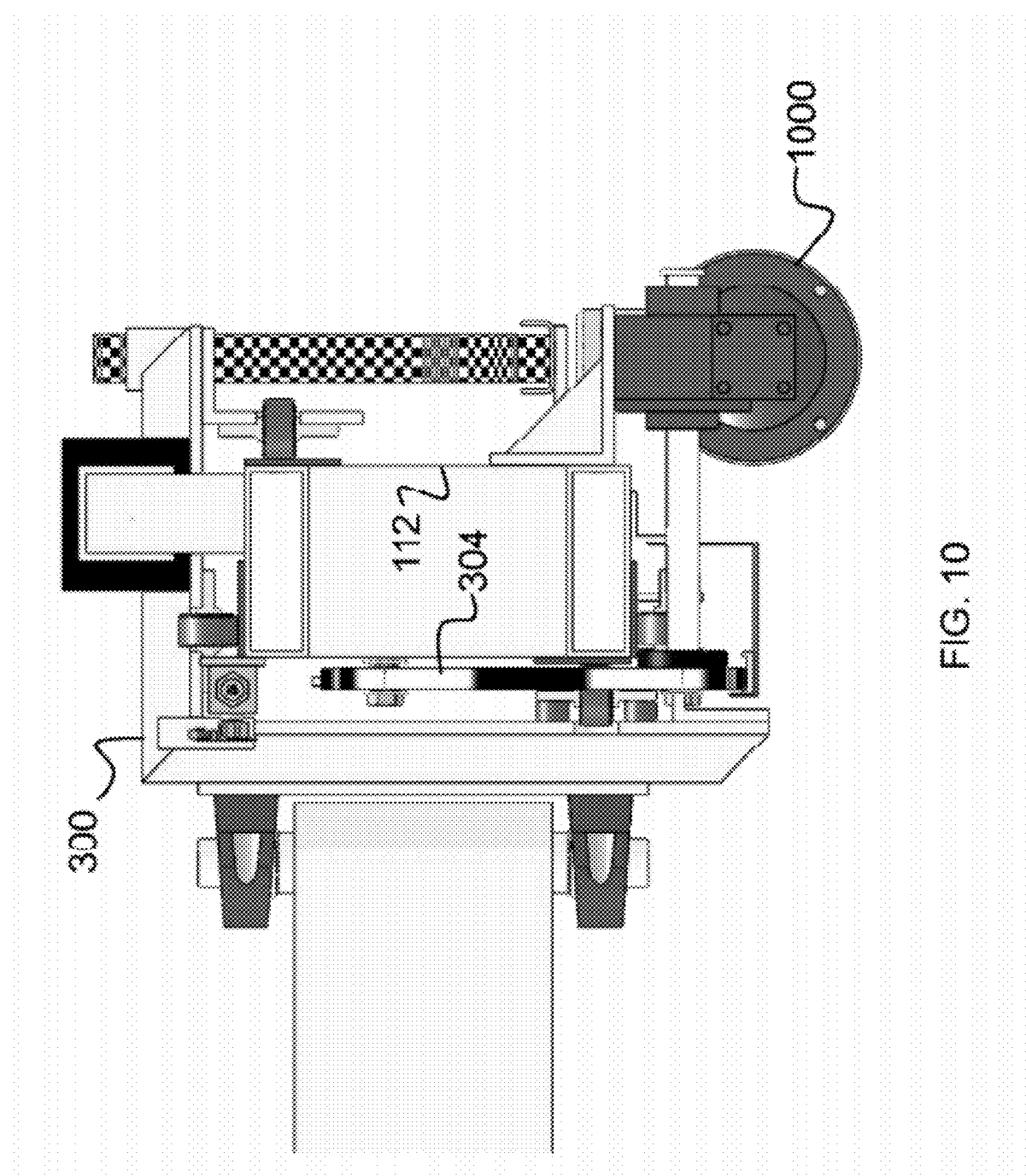
FIG. 10 is a side-view illustration of the carriage frame with a brush arm carriage wrapped around the carriage frame and depicting the carriage drive system for driving the brush arm carriage.

As noted above and as shown in FIG. 10, the present invention uses a carriage drive system to cause the brush arm carriage 300 to travel along the length of the carriage frame 112. The carriage drive system is any suitable mechanism or device that is operable for causing the brush arm carriage 300 to travel in the first and second carriage arm directions (as depicted in FIGS. 8A through 9L). For example, the carriage drive system can be a screw drive that drives the brush arm carriage 300. As another non-limiting example, the carriage drive system can include a carriage motor 1000 that drives a chain/belt 304 to cause the brush arm carriage 300 to slide along the length of the carriage frame 112. Because the brush arm carriage 300 is attached with the belt 304, causing the carriage motor 1000 to reverse direction allows the system to control the directional movement of the brush arm carriage 300.

Figure 11:
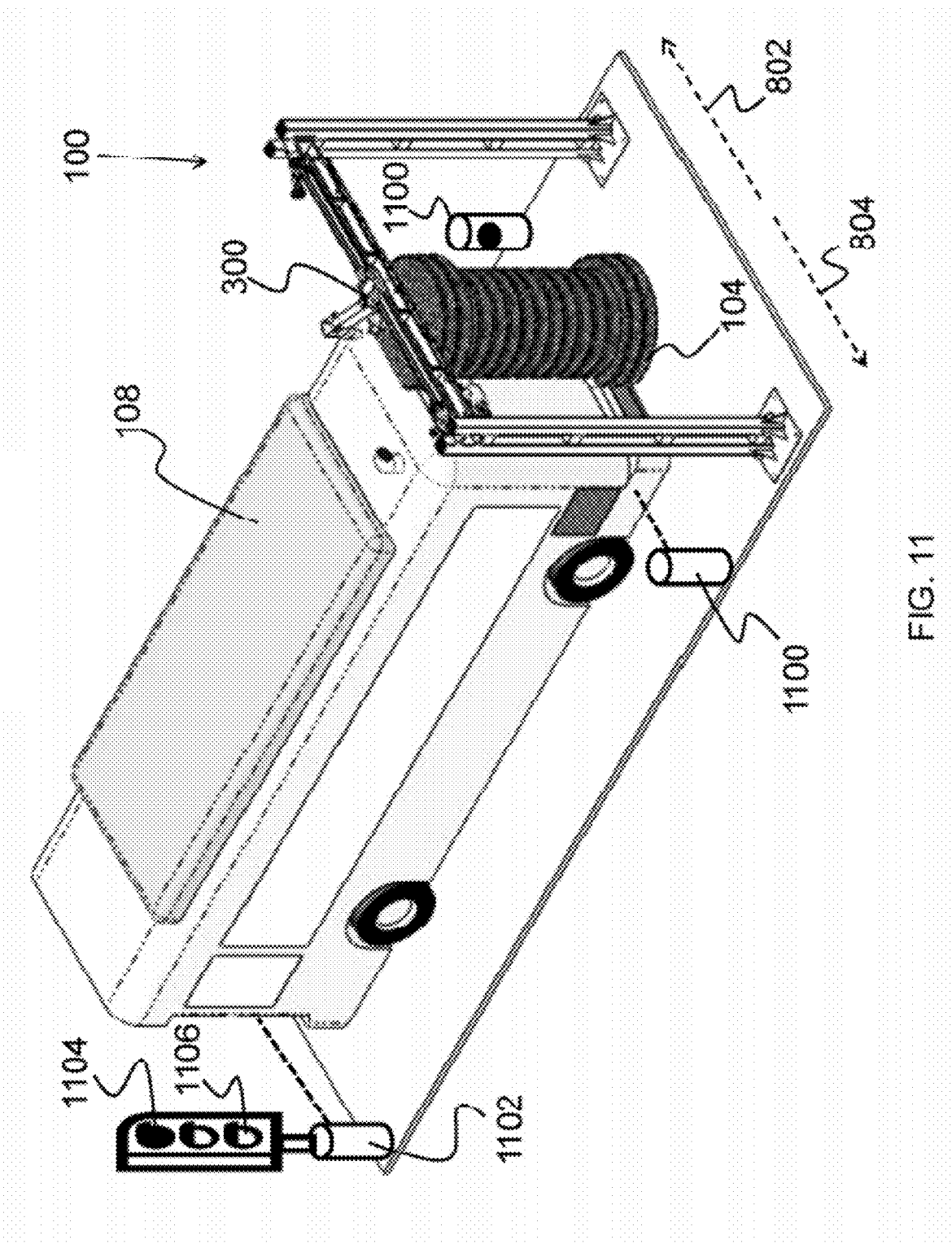
FIG. 11 is an illustration of the vehicle washing apparatus with a vehicle sensor system.

As shown in FIG. 11, to initiate and/or cease operation of the vehicle washing apparatus, the present invention can be formed to include a vehicle sensor system. Based on the presence or absence of a vehicle 108, the system initiates or ceases operation of the cleaning brush 104 and/or other components. The vehicle sensor system is any suitable system (including appropriate processors as needed) to detect the presence or absence of a vehicle 108. As a non-limiting example, the vehicle sensor system includes a first beam sensor 1100 and a second beam sensor 1100. Examples of suitable beam sensors include laser beam sensors and infrared beam sensors. The vehicle sensor system is configured to present a stop indicator 1104 (e.g., red light) to a vehicle driver after having passed the first beam sensor 1100 (e.g., the vehicle 108 breaks the beam of the first beam sensor 1100). If the vehicle 108 does not pass the second beam sensor 1102 within a predetermined amount of time (any suitable amount of time; e.g., 5 seconds), the vehicle sensor system initiates operation of the brush arm carriage 300 and cleaning brush 104.

After having traveled the first carriage direction 802 and the second carriage direction 804, the vehicle sensor system is configured to cease operation of the brush arm carriage 300 and cleaning brush 104 and present a go indicator 1106 (e.g., green light) to the vehicle driver.

It should be appreciated that while washing the rear of the vehicle 108, the driver may become impatient and decide to leave the vehicle washing apparatus 100. Thus, while in operation, if the vehicle 108 passes the second beam sensor 1102 (e.g., breaks the beam), the vehicle sensor system is configured to cause the brush arm carriage 300 to return to the home position and cease operation of the cleaning brush 104.

As can be appreciated by one skilled in the art, the vehicle washing apparatus of the present invention can be formed to include a suitable processor or computer system having a memory and corresponding processor that may be needed to cause the components to perform the operations described herein. For example, the present invention can be formed to include a data processing system. The data processing system comprises an input for receiving information from at least one sensor for use in detecting the presence of a vehicle. Note that the input may include multiple "ports." Typically, input is received from at least one sensor, non-limiting examples of which include a beam sensor. An output is connected with the processor for causing the relevant components of the vehicle washing apparatus to perform said operations. An output can also be used to provide information regarding the presence of a vehicle in the vehicle washing apparatus to other systems in order that a network of computer systems may serve as a data processing system. Output may also be provided to other devices or other programs; e.g., to other software modules, for use therein. The input and the output are both coupled with a processor, which may be a general-purpose computer processor or a specialized processor designed specifically for use with the present invention. The processor is optionally coupled with a memory to permit storage of data and software that are to be manipulated by commands to the processor. While the vehicle washing apparatus 100 can be formed to use a data processing system, it should be understood that such a data processing system is optional as the present invention can be implemented with switch mechanisms without requiring a microprocessor or processing commands.

What is claimed is:

1. A vehicle washing apparatus with a movable brush arm carriage, comprising:
    a carriage frame for suspending above a passing vehicle, the carriage frame having a length that is wider than a width of a passing vehicle;
    a brush arm carriage slidably connected with the carriage frame;
    a carriage drive system connected with the carriage frame and the brush arm carriage for causing the brush arm carriage to slide along the length of the carriage frame;
    a brush arm rotatably connected with the brush arm carriage;
    a cleaning brush rotatably connected with the brush arm;
    a brush drive system for causing the cleaning brush to rotate; and
    wherein the brush arm has a brush arm axis, and wherein the brush arm is connected with the carriage frame such that an angle of incidence exists between the brush arm axis and a ground surface, with the angle of incidence being greater than zero degrees and less than 90 degrees, whereby the angle of incidence causes the cleaning brush to be gravity fed toward a passing vehicle.

2. The vehicle washing apparatus as set forth in claim 1, wherein the brush arm is rotatably connected with the brush arm carriage via a set of brush arm bearings and bearing brackets.

3. The vehicle washing apparatus as set forth in claim 2, wherein an adjustment apparatus is operably connected between the brush arm carriage and the brush arm to allow adjustments to the angle of incidence.

4. The vehicle washing apparatus as set forth in claim 3, wherein the adjustment apparatus includes a tip plate connected between the set of bearing brackets and the brush arm carriage.

5. The vehicle washing apparatus as set forth in claim 4, wherein the carriage frame includes a limit switch at each end of the length of the carriage frame, such that the carriage drive system causes the brush arm carriage to leave a home position and slide along the length of the carriage frame in a first carriage direction until contacting a first limit switch, at which point the carriage drive system causes the brush arm carriage to reverse direction and slide along the length of the carriage frame in a second carriage direction until reaching a second limit switch at the home position.

6. The vehicle washing apparatus as set forth in claim 5, wherein the brush drive system causes the cleaning brush to rotate in a first rotation direction while the brush arm carriage slides along the carriage frame in the first carriage direction, such that when the carriage drive system causes the brush arm carriage to reverse direction, the brush drive system causes the cleaning brush to reverse rotation and rotate in a second rotation direction.

7. The vehicle washing apparatus as set forth in claim 6, further comprising a vehicle sensor system configured to determine if a vehicle is stationary within range of the cleaning brush.

8. The vehicle washing apparatus as set forth in claim 7, wherein the vehicle sensor system includes a first beam sensor and a second beam sensor, with the vehicle sensor system configured to present a stop indicator to a vehicle driver after having passed the first beam sensor, and if the vehicle does not pass the second beam sensor within a predetermined amount of time, the vehicle sensor system initiates operation of the brush arm carriage and cleaning brush.

9. The vehicle washing apparatus as set forth in claim 8, wherein after having traveled the first carriage direction and the second carriage direction, the vehicle sensor system is configured to cease operation of the brush arm carriage and cleaning brush and present a go indicator to the vehicle driver.

10. The vehicle washing apparatus as set forth in claim 9, wherein while in operation, if the vehicle passes the second beam sensor, the vehicle sensor system is configured to cause the brush arm carriage to return to the home position and cease operation of the cleaning brush.

11. The vehicle washing apparatus as set forth in claim 1, wherein an adjustment apparatus is operably connected between the brush arm carriage and the brush arm to allow adjustments to the angle of incidence.

12. The vehicle washing apparatus as set forth in claim 11, wherein the brush arm is rotatably connected with the brush arm carriage via a set of brush arm bearings and bearing brackets, and wherein the adjustment apparatus includes a tip plate connected between the set of bearing brackets and the brush arm carriage.

* * * * *